United States Patent [19]

Greenwald, Sr.

[11] Patent Number: 5,795,484

[45] Date of Patent: Aug. 18, 1998

[54] METHOD AND APPARATUS FOR DEWATERING

[76] Inventor: Edward H. Greenwald, Sr., 52 Nancy La., McMurray, Pa. 15137

[21] Appl. No.: 436,761

[22] Filed: May 8, 1995

Related U.S. Application Data

[60] Continuation-in-part of Ser. No. 95,862, Jul. 22, 1993, Pat. No. 5,413,703, which is a division of Ser. No. 735,386, Jul. 24, 1991, Pat. No. 5,236,596, which is a continuation-in-part of Ser. No. 112,669, Oct. 22, 1987, abandoned.

[51] Int. Cl.$^6$ .............................. B03D 3/00; B01D 21/00; B01D 21/28; C10L 9/10
[52] U.S. Cl. ............... 210/696; 210/696; 210/697; 210/768; 210/769; 209/5; 209/10; 209/17; 209/164; 209/166; 44/626; 44/622; 44/624; 44/627; 44/505
[58] Field of Search ............... 44/622, 624, 626, 44/627, 503, 505; 210/696, 697, 768, 769; 209/10, 17, 164, 166

[56] References Cited

U.S. PATENT DOCUMENTS

| | | |
|---|---|---|
| 3,361,259 | 1/1968 | Van Der Gathen. |
| 3,408,293 | 10/1968 | Dajani. |
| 4,167,397 | 9/1979 | Grant. |
| 4,195,975 | 4/1980 | Hamuro. |
| 4,267,046 | 5/1981 | Stoev. |
| 4,274,963 | 6/1981 | Purvis. |
| 4,282,088 | 8/1981 | Ennis. |
| 4,284,413 | 8/1981 | Capes. |
| 4,330,413 | 5/1982 | Wilson. |
| 4,416,666 | 11/1983 | Funk. |
| 4,437,782 | 3/1984 | Wasson. |
| 4,437,861 | 3/1984 | Ishizuka. |
| 4,437,982 | 3/1984 | Wasson. |
| 4,477,353 | 10/1984 | Messer. |
| 4,521,218 | 6/1985 | Greenwald. |
| 4,537,599 | 8/1985 | Greenwald. |
| 4,543,104 | 9/1985 | Brown, Jr. |
| 4,552,568 | 11/1985 | Igarashi. |
| 4,555,329 | 11/1985 | Sykes. |
| 4,559,060 | 12/1985 | Muroi. |
| 4,579,664 | 4/1986 | Cardini. |
| 4,618,414 | 10/1986 | Hartan. |
| 4,662,894 | 5/1987 | Greenwald. |
| 4,701,266 | 10/1987 | Janka. |
| 4,775,468 | 10/1988 | Peterson. |
| 5,089,142 | 2/1992 | Turunc. |
| 5,236,596 | 8/1993 | Greenwald. |

FOREIGN PATENT DOCUMENTS

| | | |
|---|---|---|
| 0093278 | 11/1983 | European Pat. Off. |
| 0125794 | 11/1984 | European Pat. Off. |
| 2925797 | 1/1981 | Germany. |
| 142984 | 8/1983 | Japan. |
| 142986 | 8/1983 | Japan. |
| 145259 | 8/1984 | Japan. |
| 140611 | 6/1987 | Japan. |
| 1102637 | 7/1984 | Russian Federation. |
| 2035142 | 6/1980 | United Kingdom. |
| 2121433 | 12/1983 | United Kingdom. |
| 2154604 | 9/1985 | United Kingdom. |

*Primary Examiner*—Thomas M. Lithgow
*Attorney, Agent, or Firm*—Clifford A. Poff

[57] ABSTRACT

An ultra-fine coal particle fraction forms a coal product with particles that are dilatant due to the mechanical stripping of the clay contaminates from the coal surface and the subdividing of the clay to clay platelets which are peptized to maintain discreetness in an aqueous slurry. The coal particles are unflocculated and can produce an aqueously permeable barrier on a sieve. The ultrafine coal product has an increase of 100–150 BTU per pound and when combusted reduced Nox production of 20–40% is realized. In a 15×0 micron coal fraction, the sulphur content is significantly reduced.

18 Claims, 20 Drawing Sheets

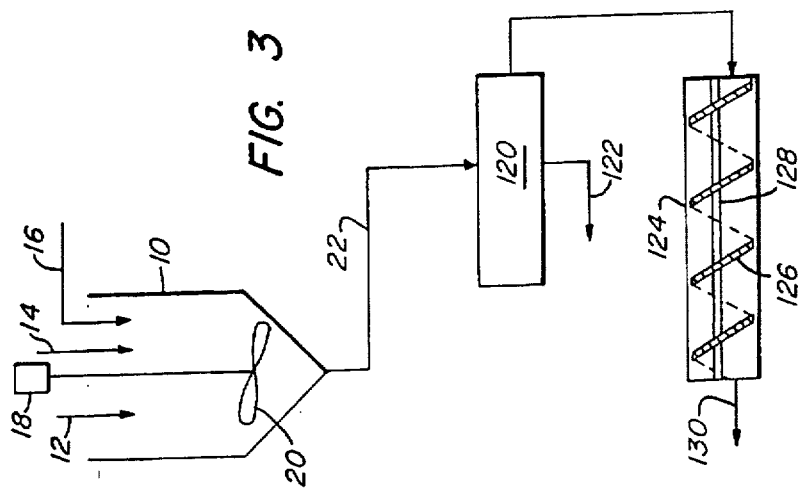
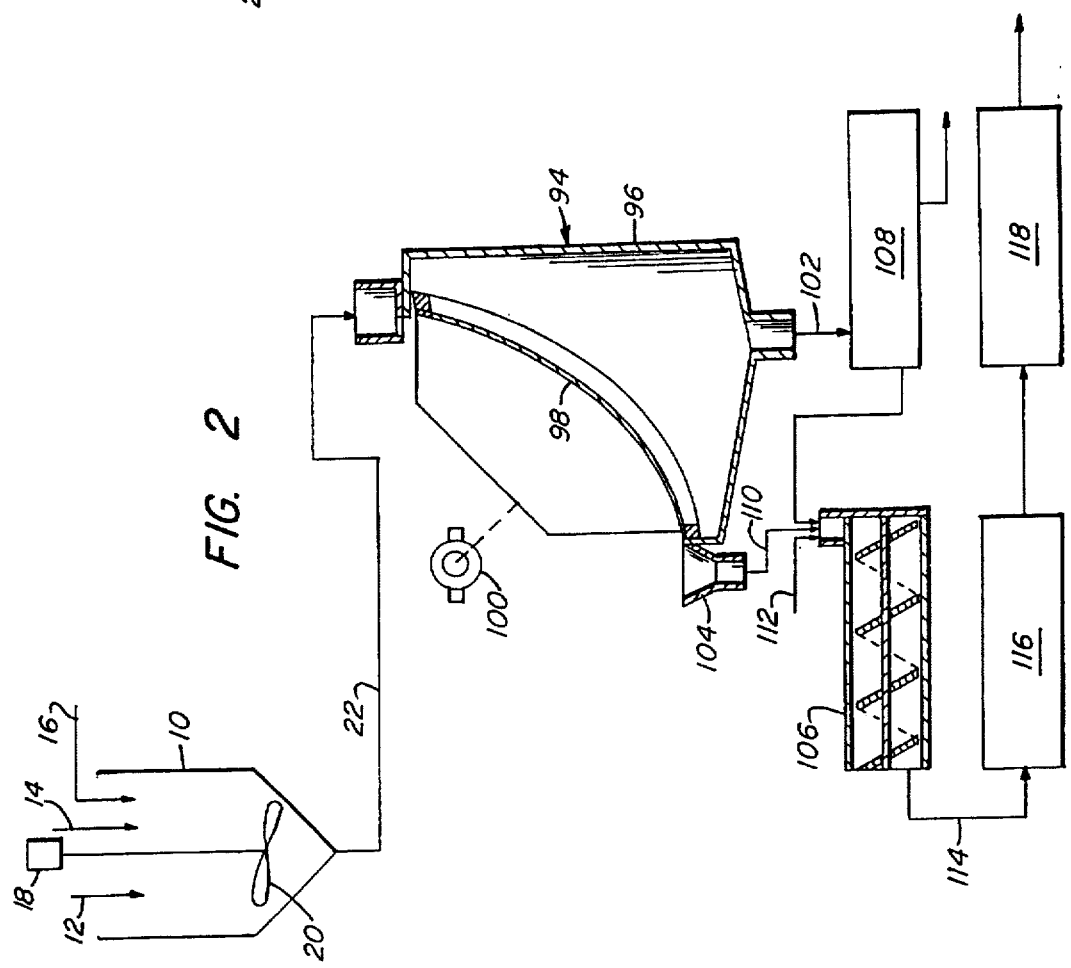

METHOD AND APPARATUS FOR DEWATERING

CROSS-REFERENCE TO RELATED PATENT APPLICATION

This patent application is a continuation-in-part of patent application Ser. No. 08/095,862, filed Jul. 22, 1993 now Pat. No. 5,413,703, issued May 9, 1995 which is a division of application Ser. No. 07/735,386, filed Jul. 24, 1991 now Pat. No. 5,236,596, issued Aug. 7, 1993 which is a continuation-in-part of application Ser. No. 07/112,669, filed Oct. 22, 1987, Abandoned.

BACKGROUND OF THE INVENTION

1. Field of the Invention

This invention relates to a fine coal product which can be derived from a method and an apparatus for dewatering ultra-fine coal recovered from a silt pond as a repository of refuse from a coal cleaning process, or refuse coal products from the cleaning of freshly mined coal or an ultra fine coal particle fraction consisting of freshly mined coal prior to cleaning, and an improved method and apparatus for treating a coal slurry to obtain a unique coal product of which sulphurous contaminants are reduced to levels of at least 0.40 percentage points lower sulphurous contaminants than heretofore obtained by known treatment of ultra fine coal particles particularly to dewatering an aqueous coal slurry after separating peptized clay from the coal particles in a slurry thereof.

2. Description of the Prior Art

In U.S. Pat. No. 4,537,599 there is disclosed a process for removing sulphur and ash, particularly clay and pyrite from the surface of coal particles. A peptized slurry of coal particles is treated to separate clay and pyrite from the coal and weaken chemically bonded contaminants on the coal surface. The clay and pyrite particles are dispersed as a colloid in an aqueous medium of the slurry. To maintain the colloidal suspension, the pH of the slurry is adjusted by the addition of a normalizer. The slurry is then beneficiated in a centrifuge and in froth-flotation cells to recover coal particles greater than two microns. Thereafter, an aqueous coal slurry is again formed and the pH is adjusted to maintain contaminants as colloids in the aqueous medium of the slurry during treatment with sonic energy and ozone. Thereafter, the aqueous coal slurry with the aqueous medium containing colloidal contaminants is classified to again separate coal particles from contaminants.

The cleaned coal product recovered from this process can be used for diverse purposes, which can be as disclosed in U.S. Pat. Nos. 4,662,894 and 4,521,218, is as a feedstock for the preparation of a coal water mixture. The cleaned coal product is first separated so that coal particles of different size classifications form two or more coal feed streams which are delivered to separate surge vessels in a liquid medium. The feed stream comprised of coal particles having the smallest size are again classified to discard a minus two micron fraction which is comprised mainly of contaminants, particularly clay, and thereafter selected quantities of each of the coal feed streams are mixed together in the presence of a dispersing agent to form a coal-water mixture.

It is time consuming and costly, particularly in terms of energy requirements, to reduce the water content of a mass of coal particles, particularly in instances where the coal particles after cleaning to remove clay and pyrite are to be used in the form of a feedstock having a low moisture content for any of diverse purposes such as for a coal-water mix. The moisture content of the cleaned coal after classification in the centrifuge according to the process of U.S. Pat. No. 4,537,599, is usually about 32% to 36% by weight and no significant moisture reduction occurs even after several days residence in storage. When an aqueous coal water slurry is dewatered in a conventional belt press, it was found that the moisture content was about 36%.

SUMMARY OF THE INVENTION

It is an object of the present invention to provide a coal product treated according to a method and apparatus for economically reducing the water content after processing of an aqueous coal slurry to a greater extent than heretofore possible without using sensible heat.

It is a further object of the present invention to provide a fine coal product derived from a method and apparatus for economically dewatering a mass of ultra fine coal particles by treating the coal particles as part of an aqueous slurry wherein the coal particles are rendered hydrophobic and clay contaminants stripped from the surface of the coal particles are treated so as to flow freely from the mass of coal particles in the aqueous medium.

It is a further object of the present invention to provide a fine coal product method and apparatus for dewatering an aqueous coal slurry wherein the slurry is subjected to high shear forces in the presence of a peptizing agent so that hydrophilic clay particles stripped from the coal particles are rendered readily separable with the aqueous medium from the coal particles by treatment of the aqueous coal slurry with vibratory energy which can take the form of an air stream to drive aqueous medium from the coal particles.

More particularly, according to the present invention, there is provided a coal product produced according to a method of treating clay contaminated ultra fine coal particles, the method including the steps of forming an aqueous slurry of clay contaminated ultra fine coal particles, mechanically stripping clay contaminants from the surfaces of the coal particles while subdividing the size of the clay contaminant to clay platelets, peptizing the clay platelets to impart a state of discreetness in the aqueous slurry, collecting a mass of dilatant coal particles in a superimposed relation upon a dilatant coal layer, the dilatant coal layer being defined by forming an aqueously permeable barrier comprised of a dilatant coal layer of collected coal particles from the slurry upon a barrier, using the dilatancy of the dilatant coal mass in combination with an applied force for dewatering the coal mass by draining aqueous dilatancy of the dilatant coal mass in combination with an applied force for dewatering the coal mass by draining aqueous medium along with peptized clay platelets from the coal mass, and recovering the coal mass.

The coal product of the present invention is also characterized by a fine coal product essentially including an ultra fine coal particle Fraction of 300×0 microns, the coal particles being dilatant by the mechanically stripping of clay contaminants from the surface of the coal particles and subdividing the clay to clay platelets in the presence of a peptizing agent to peptize and maintain clay platelets discreet in an aqueous slurry, the dilatant coal particles being unflocculated and capable of producing an aqueously permeable barrier on a sieve for forming a filter cake having a moisture content of 8 to 15% lower moisture than an ultra fine coal particle fraction of 300×0 microns before stripped of clay, the reduction of clay contaminants on the coal particles increasing a calorific value at least 100 Btu per pound as determined by a bomb calorimeter.

BRIEF DESCRIPTION OF THE DRAWINGS

These features and advantages of the present invention as well as others will be more fully understood when the following description is read in light of the accompanying drawings in which:

FIG. 2 is a schematic illustration of a second embodiment of the apparatus of the present invention which is also suitable to carry out the method of the present invention;

FIG. 3 is a schematic illustration of the third embodiment of the present invention;

DESCRIPTION OF THE PREFERRED EMBODIMENT

Figure 1:
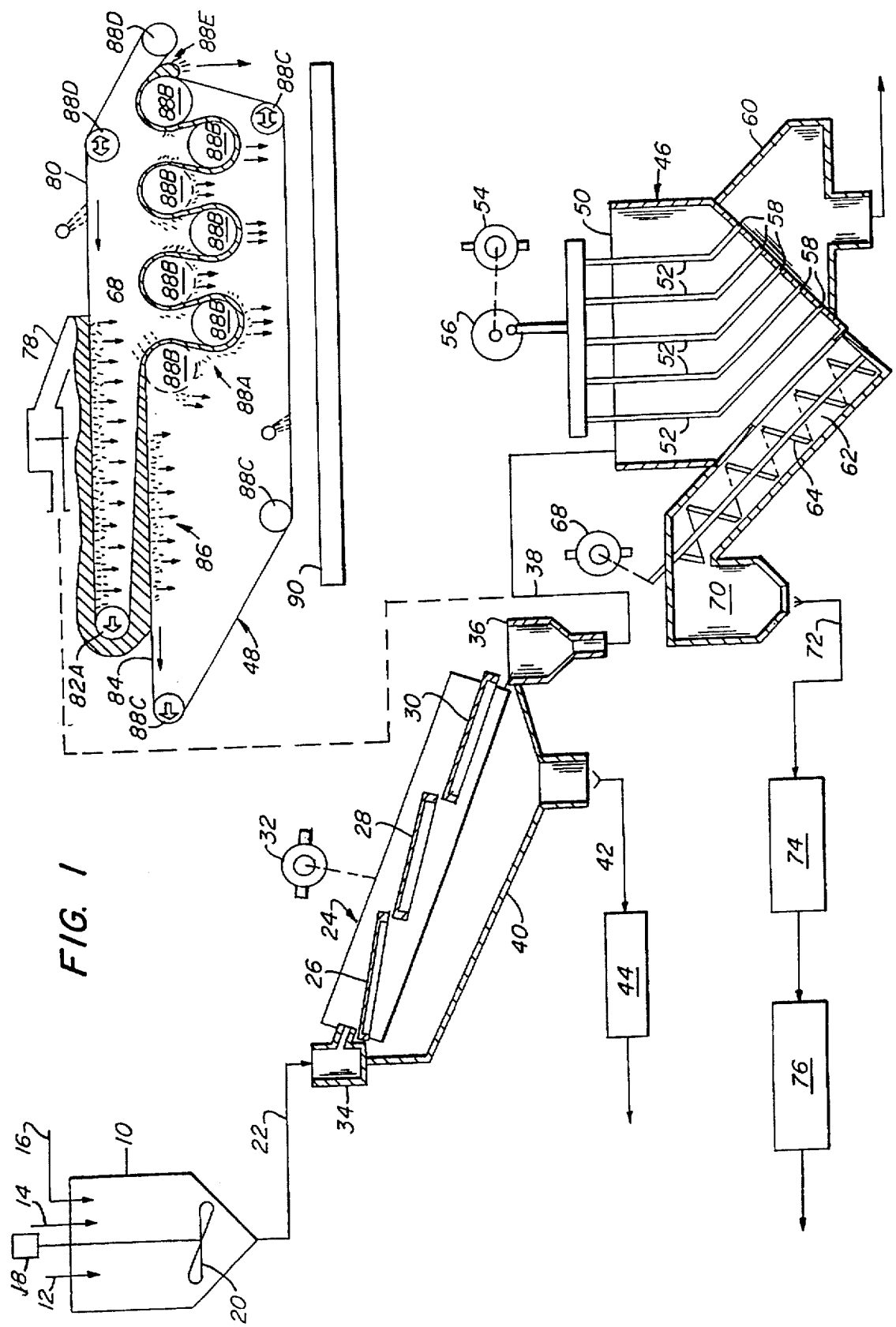
FIG. 1 is a schematic illustration of one arrangement of apparatus of the present invention which is also suitable to carry out of the method thereof.

As is known, for example, from an article entitled *Fine Coal Preparation—An Overview by: Joseph L. Walker*, published. Fine coal producers face a special problem in terms of transporters, users and producers of the product because of the coal particle size, ash content and moisture. The problem is particularly acute with ultra-fine coal particles because as the dimensions of the coal particles decrease, the number of coal particles increase as the cube of the reduction ratio and because as the dimensions of the particle decreases the mass of the particle decreases inversely as the cube of the particle, and finally as the dimensions of the particle decrease the surface area of the particle decreases as the square of the reduction ratio. In short, there is with a decreasing particle size an exponential increase in the number of particles and surface area. Moisture retention particularly by clay contaminated ultra fine particles is unacceptably high whereby a coal mass made up predominantly of coal particle fines less than 40 microns is not a useful coal supply. This is because of the low BTU value due to the high ash and high moisture content.

In wet coal cleaning processes, clay becomes a slurry in the washing media. After separation into clean coal and reject, every attempt is make to rinse the clay residual from the clean coal surfaces, but because of the affinity of clay for coal, a coating of clay always remains. In this manner, the coal washing process, after rinsing, effectively concentrates the residual clay on the surfaces of the recovered ultra fine coal particles.

The quantity of clay that is retained by any given ton of coal so washed is a function of the relationship of the surface area to mass of the particles of coal encompassed therein. For example, one ton of ¼" cubical coal particles, with all surfaces of each having a coating of clay of one platelet (0.20 microns) in thickness, will include about one half pound of clay. In comparison, one ton of ultra fine cubical coal particles of 40 micron size with its surfaces so covered, will have about 157 times as much clay coated surface area, and in turn, will retain some 80 pounds of clay.

The present invention seeks to provide a fine coal product essentially including ultra fine coal particle fraction of 300×0 microns that is not only low in ash content but unusually low in moisture content, but with an elevated moisture ash free BTU value of 100 to 150 BTU per pound of coal. The coal product of the present invention is derived from a feedstock which may be a coal fraction of freshly mined coal before cleaning or a waste coal fraction from a coal cleaning operation or coal particles from silt ponds or other suitable sources. The feedstock can be an aqueous slurry, as for example, the underflow from a static thickener or other thickening device common to the practice of coal processing. Untreated ultra-fine coal may comprise the feedstock for the process and apparatus of the present invention. Such coal generally has constituent components of: coal of varying purity; high ash impure coal or bone; clay and clay shales; pyrite/marcasite; and various other high ash carbonaceous and non-carbonaceous rocks and minerals. If desired, the feedstock can be cleaned coal particles derived from other coal cleaning process after treatment for removal of any contaminates from the surfaces of coal particles that are to be peptized. Preferably the feedstock is made up of coal particles typically 100 mesh or less but can be 4 mesh or less, Tyler series.

The coal product of the present invention is characterized by a reduced total sulphur content which is particularly attributed to the ability to convert pyrite to sulfate sulphur through oxidation of the pyrite under oxidizing conditions made possible by the removal of clay contaminants from the coal surface. In silt pond coal particles, the iron sulfite in the coal particles recovered as a filter cake has been allowed to age over a period of time, years, whereby oxidation of the pyrite content converts the pyrite to sulfate whereby the sulfate content appears at about 50 times greater than the sulfate content of freshly mined coal. The freshly mined coal typically has a sulfate content of between 0.01 to 0.02%. The sulfate content of freshly mined coal is significantly increased due to the oxidation of pyrite that occurs once after clay is stripped from the surface from the coal particles and coal particles are subject to oxidizing conditions. The total sulphur content of the coal product is reduced by 0.40 percentage points as will be explained in greater detail hereinafter.

Referring now to FIG. 1, there is illustrated a mixing vessel 10 into which there is added a coal feedstock, which is indicated by reference numeral 12, the feedstock which can be any of the feedstocks just described. The vessel 10 also receives water, if required, which is introduced by line 14 to form an aqueous slurry in the vessel to which there is also added a peptizing agent by way of line 16. Preferably the aqueous coal slurry contains 15% to 35% solids by dry weight. The peptizing agent is added as one step in the forming of the aqueous coal slurry. Any one of a number of substances can form the peptizing agent, an example of one peptizing agent is sodium hexametaphosphate which is effective in a pH range of about 6.8 to about 8.0.

In the forming of the peptized coal slurry, a motor 18 is energized to rotate a mixer blade 20 that is submerged in the tank. The mixer is operated for a period of time, usually at least 5 minutes under operating conditions that impart high shear forces to the coal water slurry. During the high shear mixing/peptizing period, a high degree of aeration or air entrainment takes place including solubilizing of air in the water of the slurry. Thus there is solubized air in the water on the surface of the coal particles. The application of high shear forces breaks the adhesion and ionic bonds which bond clay particles. The mixing of the slurry in the peptizing vessel, peptizes the clay particles and deagglomeration occurs which renders the individual coal impurities, other than clay, and clay particles into a state of discreetness. The individual clay particles fall within a typical size range of between 0.68 to 2.0 micrometers and interact with a peptizing agent to effect an ionic exchange thereby imparting to the clay particles a strong negative electrokinetic charge. The peptized clay particles become discrete and become suspended as a colloid in the associated water of the slurry. Under these conditions, the individual coal particles attain a state of discreetness from clay and other coal impurities released from the face surfaces of the coal particles. Once free of adhered clay, the coal particles are rendered hydrophobic. In the event the selected peptizing agent requires a pH adjustment to the aqueous slurry, then according to the demands of the particular peptizing agent a suitable neutralizing agent is introduced into the vessel to bring about the required pH adjustment.

The treated aqueous slurry is then discharged from the vessel 10 by line 22 to a wet screening apparatus 24 having three tandemly arranged vibrating screens 26, 28 and 30 where the aqueous phase along with peptized clay particles and other undersized contaminants drain from the coal particles which remain on the screens. After the initial drainage of a predominant liquid part of the aqueous phase, the vibrating screen, imparts energy to the coal particles which are now in a state of dilatancy. The energy causes an expulsion of surface moisture from the coal particles along with clay particles associated therewith. It can be expected that the moisture content of the overflow product will be reduced from an initial 70%–75% moisture by weight down to 30%–31% percent moisture content when discharged from the vibrating screens. The reduced moisture content is significantly less than the usually 40% which is obtained without peptization and attendant clay desliming.

The wet screening apparatus illustrated in FIG. 1 is of the type well known in the art and made by Derrick Manufacturing Company of Buffalo, N.Y. The three screen panels 26, 28 and 30 are mounted on a frame which is excited by a high speed vibrating motor 32. The screen panels preferably have screens having a 400 mesh (37 microns) size. Typically, the screen panels vibrate at 3600 cycles per minute which is a high frequency vibration having a low amplitude to rapidly expel aqueous liquid including clay, which may still be present, from the coal particles. The aqueous coal slurry is distributed across the width of the first screen panel 27 by a head box 34. The screen panels are inclined to the horizontal in a manner such that the screening surfaces extend downwardly to a terminal end where the top screen product passes to an underlying collector 36 which directs the top screen product to discharge line 38. The aqueous liquid medium, peptized clay, other undersized contaminants and undersized coal particles pass through the screens and are collected in an inclined underlying tray 40 for discharge from the machine by conduit 42.

The solids of the underflow are minus 37 micron fractions which can be discarded or when desired the residual coal content can be recovered by treatment in froth flotation cells or in a high speed centrifuge. The peptized condition of the underproduct greatly enhances the separation process by froth cells. The coal is more amenable to the action of the frothing agent and the efficiency of coal recovery is improved.

When a high speed solid bowl centrifuge is used, a cut should be made at about 2 microns because it was believed clay was predominantly contained in a minus 2 micron fraction. It is preferred, however, to use froth flotation to effect the size separation and for this purpose the use of the froth cells will enable the recovery of submicron-sized coal particles which greatly benefit the particle size distribution in the coal product of the present invention including particle loading in coal water mixes. To be economically feasible the plus 2 microns but preferably submicron-sized particles of the minus 37 micron fraction must be mainly coal. The burden on the centrifuge is reduced due to the initial separation by the vibrating screens. In FIG. 1 conduit 42 is illustrated schematically in which clay and other contaminants conducted by the conduit are discharged into a silt pond or a waste area generally indicated by reference numeral 44. The screen over product recovered from the vibrating screens is delivered by line 38 to a vibrating hopper 46 or if desired the top screen product may be delivered first to a belt press 48.

When the coal mass is delivered by line 38 from the vibrating screens to the vibrating hopper 46, the coal particles collect in a hopper chamber 50 wherein vibrating tubes 52 are arranged as fingers as shown in FIG. 1, extending along the height of the coal mass and angularly at the bottom portion to exit sites in one of two stopping bottom wall sections. The tubes 52 are perforated and packed with long grained filter media. A motor 54 coupled through an eccentric 56 to vibrator frame imparts low frequency large amplitude vibration to the tube 52. The tubes deliver liquid collected in the hopper chamber to drainage ports 58 which communicate with a drain box 60. The hopper chamber 50 has an opening in the other slopping bottom walls which communicate with a discharge chamber 62 having helical flight attachments 64 on a shaft 66 driven by a motor 68. Coal particles are carried by the flight attachments from the bottom of the hopper chamber to a discharge header box 70 for delivery by line 77. The incoming coal particles in line 38 typically have a moisture content of 30%–31% by weight. After about 29 minutes treatment time in the vibrating hopper, the moisture content is reduced to 24% by weight.

Energy can be imparted to the mass of coal in the hopper chamber 50 by other means than mechanically operative vibrator device. Such other means can take the form of perforated tubes extending in the coal mass in a manner similar to tubes 52. The perforated tubes connected with a header by which compressed air can be delivered to the tube and exhausted through the perforated openings to the coal mass. Such streams of compressed air permeating the coal mass transfers sufficient energy to drive moisture from the surface of the coal particles.

When it is desired to speed up the dewatering process, the coal particles in line 38 are first mixed with a small quantity, typically 1% lignosulfonate but preferably citrus oil sold by POLO of Italy ***by weight of coal particles in a ribbon type mixer 74 and then the admixture of coal particles and lignosulfonate but preferably citrus oil are fed to the hopper chamber 50. After about 10 minutes treatment in the vibrating hopper, the moisture content of the coal is reduced to about 24% by weight when discharged from the hopper. No further moisture reduction will occur beyond 10 minutes treatment time with the lignosulfonate but preferably citrus oil but preferably citrus oil in the hopper 46. The lignosulfonate but preferably citrus oil has an affinity for carbon and therefore drives adhered moisture on the coal from the coal particles.

A surprising result resides in the discovery that the removal of the clay renders the resulting coal particles particularly suitable for extruding operations to produce a product which can be more easily handled and shipped. Ultra fine clay containing coal without dewatering including desliming, according to the present invention, cannot be extruded without a moisture reduction to below about 10% by weight and the addition of expensive lubricants and binders. The extruder is identified by reference numeral 76.

The feed stream in line 38 can be fed alternatively to a chamber 78 of the belt press 48 and discharged under gravity onto a first endless belt 80 which carries the coal water burden beyond a roller 82A to a second endless belt 84. The belts 80 and 84 are sieve belts made of synthetic fiber so that liquid, particularly water, can freely pass from the coal particles on and between the belts on a horizontal drainage section 86 and in a roller pressing section 88B. Liquid draining from the belts is collected in a container 90. The coal and liquid mixture between the belts entering section 88A is subject to high pressures and shearing forces as the belts pass along a tortuous path formed by rollers 88B which are connected to a suitable drive. Other rollers 88C and 88D as well as roller 88A are removably mounted to control tensioning of the belts by actuators. The dewatered feed stream is discharged from between the belts at 88E. The coal mass recovered from the belt press is ready for use.

The hydrophobic characteristic of the mass of recovered coal particles from the vibration hopper or belt press even without the addition of lignosulfonate but preferably citrus oil undergoes an accelerated reduction to the moisture content. Upon exposure to the atmosphere, a constant rate drying period is initiated during which the surface of the coal mass is entirely wet. Evaporation takes place at whatever rate is dictated by the surrounding conditions of air temperature, humidity and replacement rate of air and coal particle moisture. An upward change in the temperature of the cake whether induced internally or by external means, results in an expansion of the solubilized air. This results in creation of internal pressure on the entrained moisture in capillaries and interspaces between coal particles. Net effect of this is to accelerate the capillary migration, or wicking of the internal moisture toward the surface of the coal mass and in turn, the reduction of time required for the evaporative process to be totally effective.

The wet screening apparatus is surprisingly effective and produces a dramatic reduction to the water content to the top screen product. Prior to the present invention, it was not possible to reduce the water content of clay contaminated mass of minus 100 mesh (minus 150 microns) coal particles recovered from an aqueous slurry below about 40% by weight. Moreover, a more surprising result is the dramatic decrease of the ash content of the various fractions of the minus 100 mesh (minus 150 microns) screen over-product when compared with a wet sieve analysis of a peptized head sample of the feed to a Derrick screen equipped to separate at a nominal 400 mesh or 37 microns. The results are given in Table I.

TABLE I

| Mesh | Weight | | | | Dry Ash | | | |
| --- | --- | --- | --- | --- | --- | --- | --- | --- |
| | Head Sample | | Overproduct | | Head Sample | | Overproduct | |
| Size | % | Cum. | % | Cum. | % | Cum. | % | Cum. |
| 100×325 | 32.1 | 32.1 | 66.0 | 66.0 | 15.9 | 15.9 | 8.2 | 8.2 |
| 325×400 | 5.1 | 37.2 | 10.6 | 76.6 | 17.2 | 16.1 | 11.6 | 8.7 |
| 400×500 | 5.7 | 42.9 | 6.0 | 82.6 | 20.3 | 16.6 | 12.9 | 9.0 |
| −500 | 57.1 | 100.0 | 17.4 | 100.0 | 45.6 | 32.1 | 39.8 | 14.4 |

Wet sieve analyses show the transfer of the higher ash clay and other minus 37 microns impurities to the screen under product by way of the passage of the aqueous solution through the screen openings. This can be seen by comparison of the dry ash content of the screen over product fractions with those of the under product fractions. The results are given in Table II.

TABLE II

| Mesh | Weight | | | | Dry Ash | | | |
| --- | --- | --- | --- | --- | --- | --- | --- | --- |
| | Head Sample | | Under-product | | Head Sample | | Under-product | |
| Size | % | Cum. | % | Cum. | % | Cum. | % | Cum. |
| 100×325 | 66.0 | 66.0 | 0.1 | 0.1 | 8.2 | 8.2 | 11.7 | 11.7 |
| 325×400 | 10.6 | 76.6 | 0.6 | 0.7 | 11.6 | 8.7 | 13.4 | 13.1 |
| 400×500 | 6.0 | 82.6 | 5.7 | 6.4 | 12.9 | 9.0 | 20.7 | 19.8 |
| −500 | 17.4 | 100.0 | 93.6 | 100.0 | 39.8 | 14.4 | 45.8 | 45.4 |

In this test the cumulative recovery of coal values in the plus 25 microns fraction of the feed as calculated on an ash balance basis was found to be 99.2%.

In FIG. 2 there is illustrated a further embodiment of the present invention, in which vessel 10, like the embodiment of FIG. 1, receives coal feedstock, water and a peptizing agent from supply lines 12, 14 and 16, respectively. The feedstock is mixed under high shear forces by motor 18, and the mixing process is carried out for a sufficient period of time to peptize clay particles which are driven from the surface of the coal particles. The mixture is delivered from the vessel 10 to a head box of a vibrating sieve bend 94 where the aqueous phase including peptized clay and undersized solids drain to a collection pan 96 from the mass of coal particles on curved screen assembly 98. The screen assembly is vibrated by drive motor 100 at a high frequency, e.g., 3600 cycles per minute at a low amplitude motion. The under product including an aqueous phase is carried away by a drain line 102. The over-product from sieve bend 98 is delivered by way of a hopper collector 104 to a pug mill 106. The fraction in drain line 102 is delivered to a vibrating screen assembly 108 which can be the same as screen assembly 24 described hereinbefore and shown in FIG. 1. The screen over-product is delivered by line 110 to the pug mill 106. This arrangement of apparatus has the advantage of offering a greater residence time by the underflow in line 102 on a vibrator screen 108 so that the moisture on the face surfaces of the coal particles can be acted upon for a longer period of time as the coal particles pass along the vibrating screens. The product fed to the pug mill 106 is mixed with lignosulfonate but preferably citrus oil, a binder or other agent delivered by line 112 to the pug mill and mixed therein with the coal particles. The product discharged from the pug mill is delivered by line 114 to vibrating hopper 116. After dewatering in hopper 116, the coal particles form into suitable extruded shapes by extruder 118 for shipment. Instead of extruder 118, if desired, the product from the vibrating hopper can be fed to a rotating pelletizing drum, disc or pin mixer where the coal particles are agglomerated into pellets.

In FIG. 3, like the embodiments of FIGS. 1 and 2, vessel 10 receives coal feedstock, water, and a peptizing agent from supply lines 12, 14 and 16, respectively. Mixing occurs under high shear force conditions produced by blade 20 driven by motor 18. The coal slurry is delivered by line 22 to a vibrating screen assembly 120 which is the same as screen assembly 24. The screen under products can be discarded by line 122 and the screen over-product is delivered to a pug mill 124 which includes a helical mixing blade 126. Lignosulfonate but preferably citrus oil but preferred citrus oil sold to POLO of Italy is mixed with the coal particles in the pug mill to speed up the dewatering process. Aqueous liquid drains from the coal slurry in the pug mill by line 130. The coal particles can then be treated according to embodiments of FIGS. 1 and 2 downstream of assembly 24.

Figure 4:
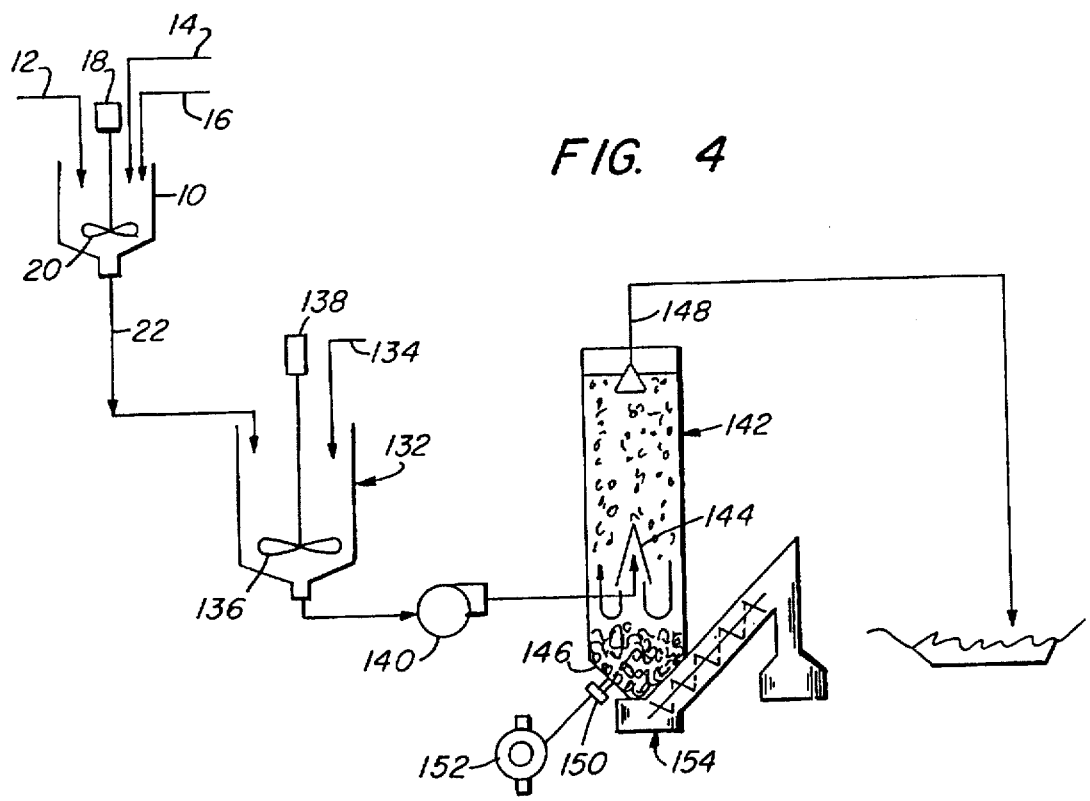
FIG. 4 is a schematic illustration of a third embodiment of the apparatus of the present invention which is also suitable to carry out the method thereof.
Figure 5:
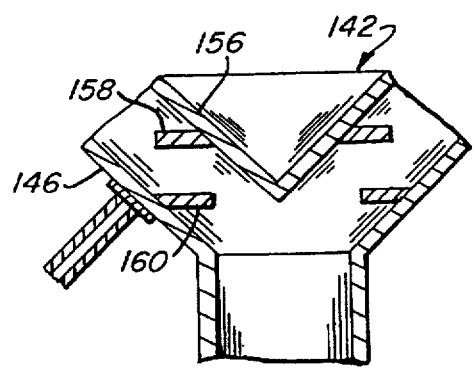
FIG. 5 is an enlarged view in section of the coal withdraw portion of a classifier included in the apparatus of FIG. 4.

In the embodiment of the invention shown in FIGS. 4 and 5, like the embodiments of FIGS. 1, 2 and 3, a vessel 10 receives coal feedstock, water and peptizing agent in lines 12, 14 and 16 respectively. The feedstock, initial pulping water and peptizing agent are introduced into the peptizing tank to produce a slurry having from 15% to 35% dry solids. The slurry is mixed for a period of time, under conditions imparting high shear forces to the coal particles. Usually a mixing time of at least 5 minutes is required. Should the peptizing agent be pH sensitive, then a pH adjustment is made to the aqueous coal slurry by the addition of a suitable neutralizing agent before the addition of the peptizing agent. This is particularly true when sodium hexametophosphate is used. Other peptizing agents which are not pH dependent are well known and can be selected for use. As explained previously, the mixing of the slurry in the peptizing vessel, peptizes the clay particles and deagglomeration occurs which renders the individual coal impurities other than clay and clay particles into a state of discreetness. The individual clay particles fall within a typical size range of between 0.68 and 2.0 micrometers and interact with a peptizing agent to effect an ionic exchange thereby imparting to the clay particles a strong negative electrokinetic charge. The peptized clay particles become discrete and become suspended as a colloid in the associated water of the slurry.

The peptize slurry after mixing, is transferred by line 22 to a dilution tank 132 wherein the percent of dry solids making up the coal water slurry is adjusted by lowering the percent to permit unhindered settling of unpeptized particles larger than the point of classification size as well as unhindered upward migration of water, clay and such other particles of coal and associated unpeptized material that are smaller in particle size than the chosen point of classification. Typically, it is desired to adjust the solid content of the slurry with the addition of water from supply line 134 whereby the dry solid content is a maximum of 10 percent but not less than 2.5 percent. Solids are kept in solution in dilution tank by means of stirring blades 136 driven by motor 138. The slurry from the dilution tank is then delivery by a flow line connected to a metering pump 140 into an up-current classifier 142. The point of entry in the classifier by the diluted coal water slurry is at the site of dispersion dispenser 144. The dispenser is a generally conical member having the apex thereof directed upward whereby a slurry entering the classifier proceeds against the inner conical wall of the disperser so that the slurry rebounds and is directed toward the truncated conical bottom 146 of the up-current classifier. The dispenser can take the form of a rotating perforated arm driven by the velocity of the aqueous slurry exiting from the perforations.

The slurry introduction procedure provides guidance for the particles of coal to settle in the manner of a sediment. Water with peptized clay as a colloid therein along with small coal particles and other minerals of lesser size migrate to a point of classification along a reverse coarse of travel and pass upwardly towards the discharge opening 148 at the top of the classifier. The classifier is constructed so as to siphon off the effluent in a quiescent and controlled manner. Since the settled coal particles and non-clay mineral particles are rendered dilatant and hydrophobic in the peptization process as opposed to a non-dilatant, hydrophilic properties of clay and a moisture of clay, coal and other associated minerals. The settled particles in the truncated conical bottom 146, of the classifier arrange themselves in a manner conductive to the exclusion of the presence of water and its accompanying peptized clay load imposed by the overlying column of liquid. Low frequency, high amplitude vibrations, generated by a vibrator 150 driven by motor 142 are imposed on the conical bottom 146 which serves as an inducement to the resistance of the introduction of water into the settled material at the conical bottom. To eliminate the possibility of rat holing, it may be necessary in some instances to install an inverted cone in the interior of the conical bottom so as to create an annular opening between the cone and conical bottom 146 of a proper width through which settled particles can pass in their downward movement towards discharge conveyor screw assembly 154 which draws off quantities of coal particles from the classifier.

As best shown in FIG. 5, an upset cone 156 is fit into the interior of the conical bottom of the separator n a spaced relation from the conical bottom 146 to form angular opening between the two cones. The width of the opening is selected so that cone particles can pass in their downward movement towards a discharge assembly 154. As the settled particles become compacted in the annular gap, free water migrates to the interface between the compacted mass and the surface of the conical bottom. Further, dewatering is achieved by a series of horizontally arranged annular rings 158 and 160 which are installed as shown in FIG. 5 on the cone 156 and annular bottom 146, respectively, to interrupt the continuity of the flow path. The rings may be packed with non-corroding metal wool so as to provide an unobstructed fee passage for captured water to exit at the ring through a portal opening in the side wall of the classifier. Each ring will produce a constant discharge of water from the classifier.

Point size of classification is a function of the vertical distance between the point of dispersion/distribution and the velocity of the upward moving column of water and its load of colloidal clay and ultra fine particles. In turn, velocity is a function of the area dimensions of the vessel, percent of dry solids in the slurry and volumetric rate of introduction of slurry into the up-current classifying vessel. Since the characteristic of each raw feedstock and the market requirements for the end product to be recovered from it are site specific and the largest size clay platelet is smaller than 2 microns, a classification point of 2 microns for most coals should prove desirable. However, higher points of classification, such as 10 microns and even as large as 25 microns, may be found more suitable to effect the desired degree of ash reduction to be attained in the process.

Ash reduction is limited to the total of the ash of the clay minerals that can be peptized. In the majority of coals this should be sufficient to reduce the ash in the finished product to a point acceptable to the market place. Since pyrite occurs as circular platelets in all sizes in ultra fine raw coal, all free pyrite in the peptized slurry of a finer size than the point of classification will report to the tailings and the sulphur content of the recovered product will be commensurately reduced.

The effect of rendering the recovered particles dilatant and hydrophobic along with compaction through vibration allows removal of the product from the classifier at an initial moisture level of about 27 percent as compared to a moisture content of about 34 percent should the product be repulped and then dewatered in a high speed centrifuge. Recovery by centrifuging of an unpeptized minus 100 mesh (minus 150 microns) feedstock produces a cake having a minimum of 40 percent moisture and more likely in the range of 50 percent to 60 percent moisture. By way of comparison, the moisture content of the underflow from an up-current classifier feed of an ultra fine unpeptized raw coal slurry will rarely be less than 65 percent.

Within the initial hour after discharge from the vessel natural drainage will eliminate all of the free water. During this period and continuing thereafter until all of the unbound water has been eliminated, the evaporation phenomenon is in effect. For example, without thermal assist the moisture content of a layer of product ½" to ¾" thick will be reduced at the rate of 1.2 percent per hour until air dry equilibrium is reached.

If the product is mixed with a small amount of lignosulfonate but preferably citrus oil and then exposed to the ambient atmosphere in a layer of similar thickness in static air, the natural evaporation phenomenon results in a reduction of the remaining unbound moisture at the rate of 3.6 percent per hour.

It is necessary to understand that ultra fine coal that has been stripped of all clay through the peptization process has entirely different physical characteristics than those of a normal coal/clay association. In addition to the dewatering phenomenon, this change in characteristics permits the reforming of ultra fine coal into larger, more marketable forms by extrusion, pelletizing or pressing. Generally, this is not presently economically possible with unpeptized ultra fine coal.

Figure 6:
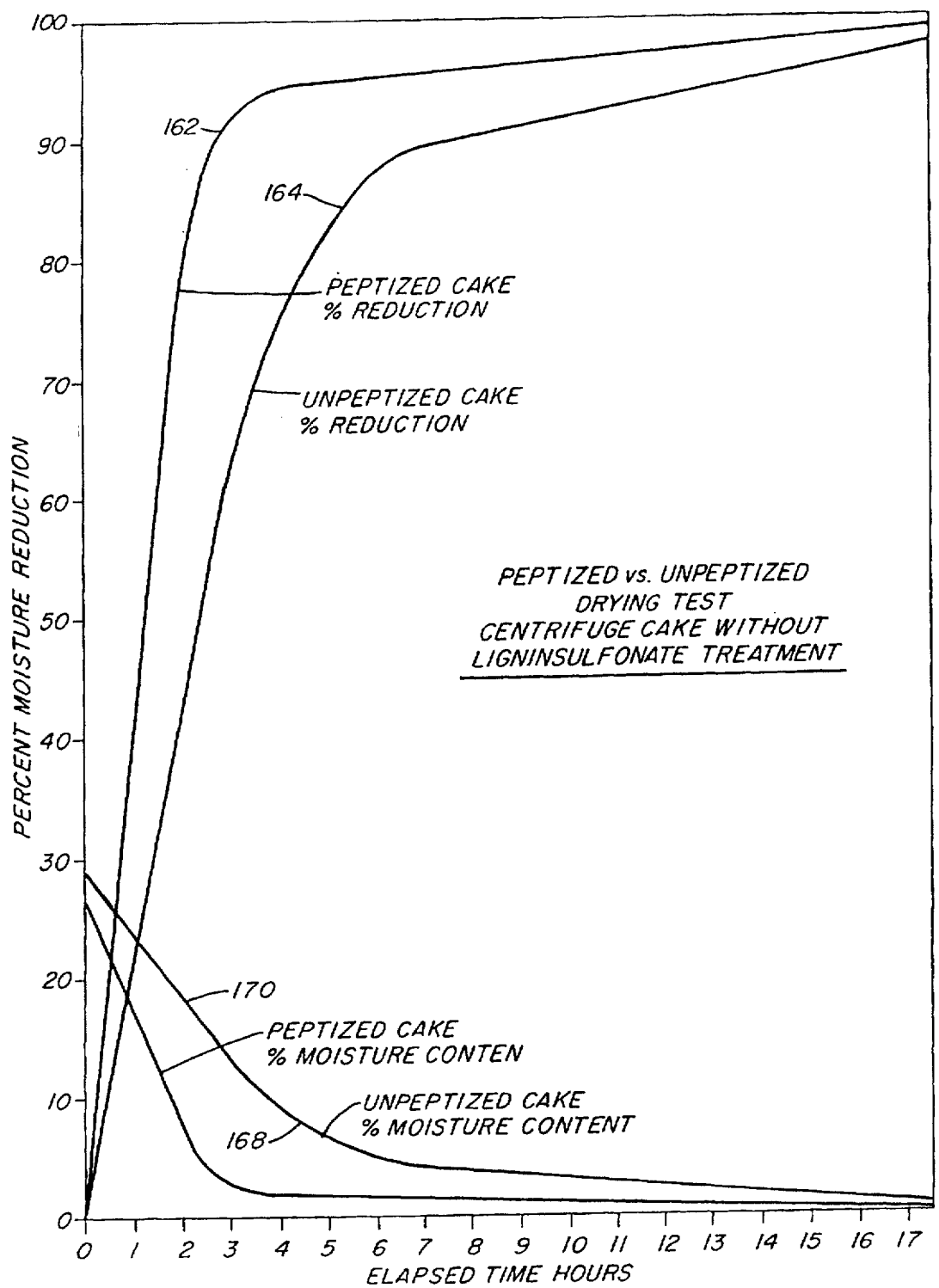
FIGS. 6, 7 and 8 are graphs illustrating the moisture reduction effect on dilatant and hydrophobic coal particles according to the present invention.

In the graph of FIG. 6, a drying test is demonstrated by a comparison between peptized and unpeptized centrifuge cakes about ¾" in thickness without the addition of lignosulfonate but preferably citrus oil in a 115 degrees Fahrenheit forced air atmosphere. As can be seen from FIG. 6, graph line 162 indicates the percent reduction of moisture in a processed cake comprised of dilatant coal particles and graph line 164 shows a reduction to moisture contact of a raw cake comprised of coal particles that are not dilatant. A dramatically increased amount of moisture is drawn from the dilatant coal particles as can be seen from a comparison of graph lines 168 and 170. The percent of moisture content in the processed cake was found to decrease as shown by graph line 168 to about 2 percent within about 3½ hours after processing according to the present invention. An unprocessed filter cake did not obtain a corresponding percent moisture content until about 14 hours after treatment as shown by graph line 170.

Figure 7:
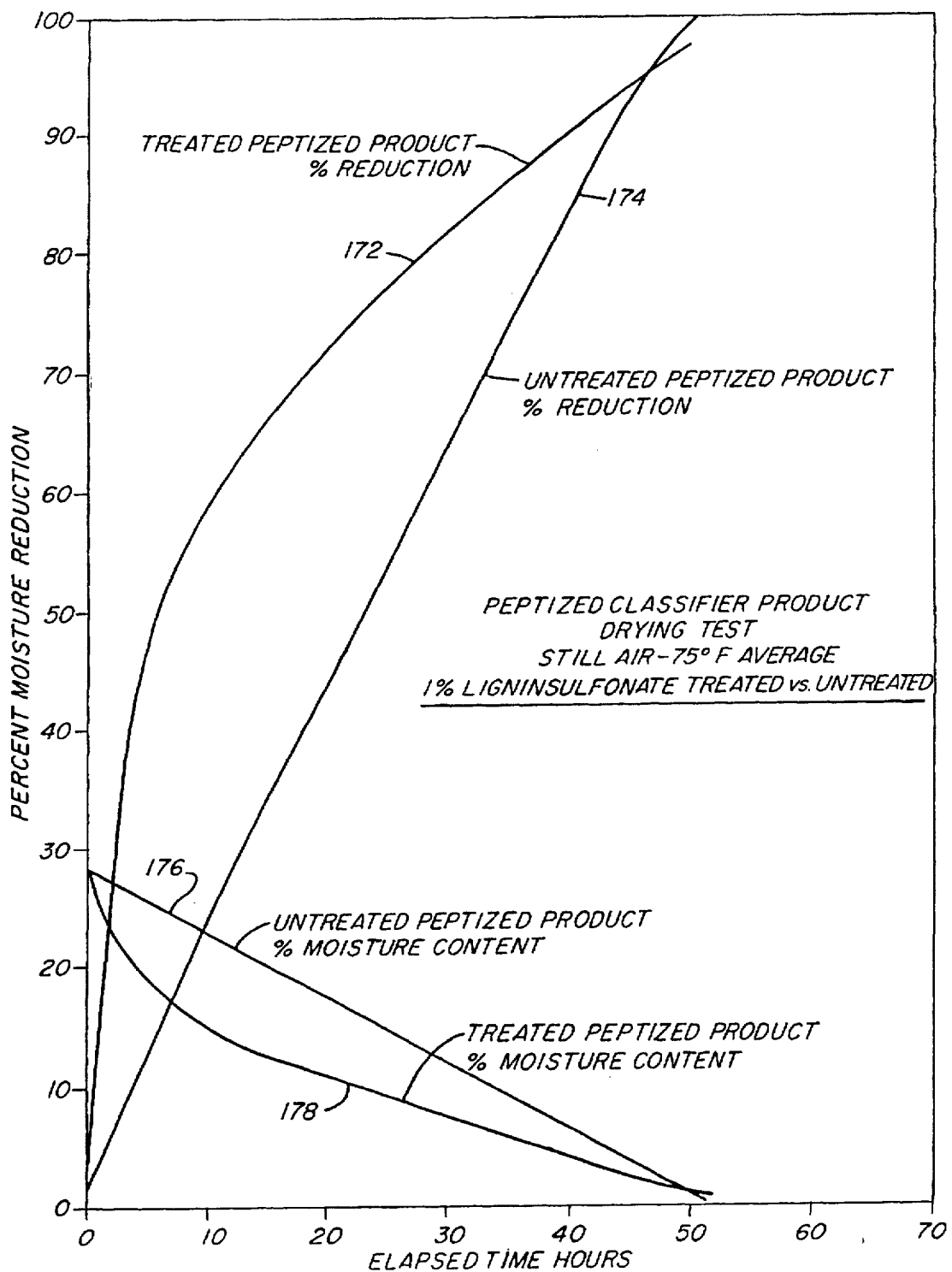

FIG. 7 illustrates, by two sets of graph curves, the percent reduction to the moisture content of a peptized classifier coal product in a drying test wherein the ambient temperature was 75 degrees F. average in static atmospheric air. Graph line 172 shows the dramatic reduction to the percent of the moisture content in the classifier product which is mixed with one percent by weight lignosulfonate but preferably citrus oil as compared with graph line 174 which shows the percent reduction to the moisture content in the same classifier product but without the addition of lignosulfonate but preferably citrus oil. There was about a 47% moisture reduction to the treated peptized product within the first five hours as compared with only about a 13% reduction during the same time period of an untreated peptized product. Similarly, the percent of moisture in the classifier product treated with lignosulfonate but preferably citrus oil dropped rapidly as can be seen by graph line 176 as compared with graph line 178 which shows the percent of moisture content of the classifier product without the addition of lignosulfonate but preferably citrus oil.

Figure 8:
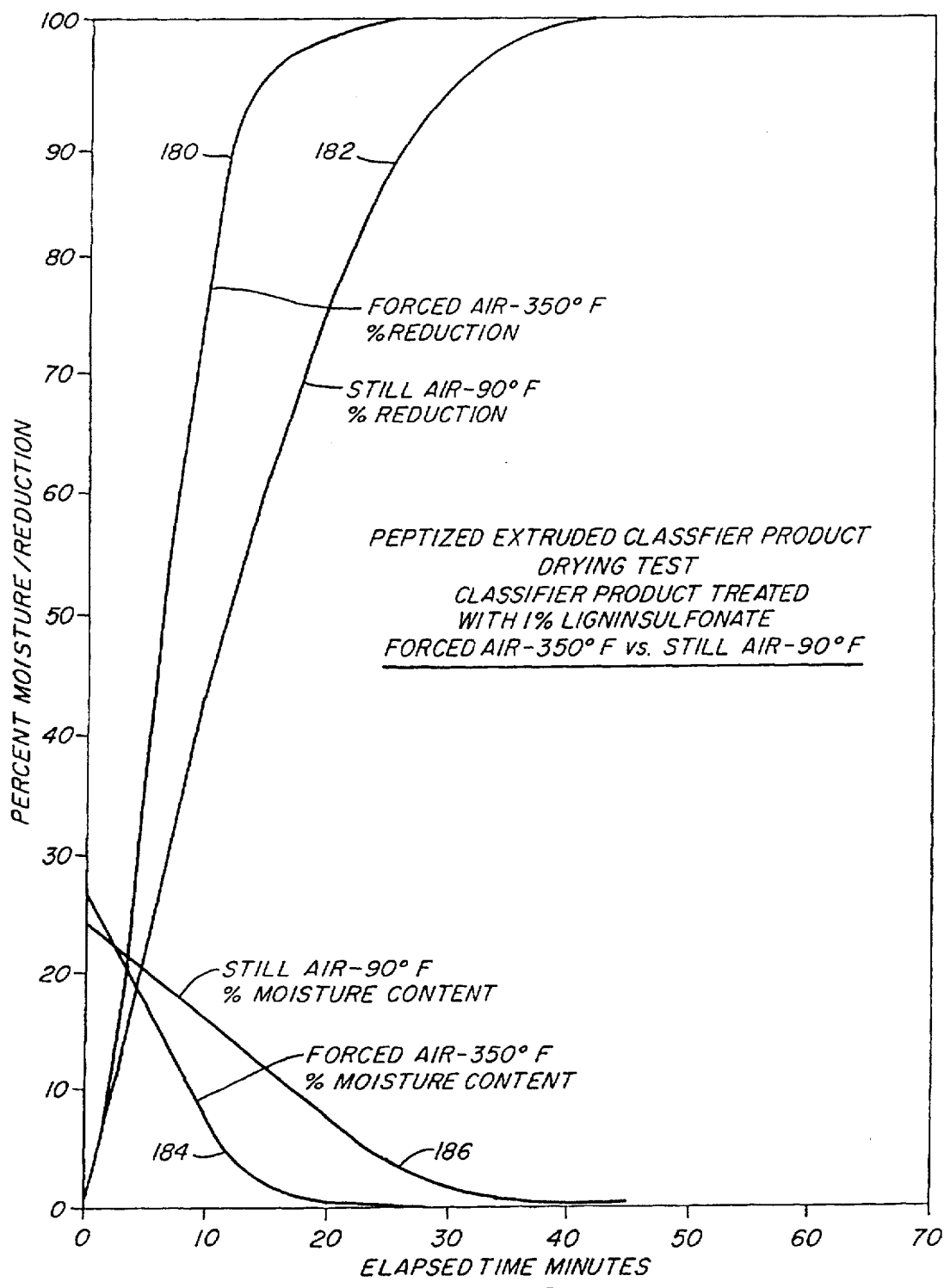

In FIG. 8, the effect of heated forced air at 360 degrees F. verses 90 degrees F. ambient still air on the moisture reduction of a peptized extruded classifier product is shown by pairs of graph lines. In the drying test depicted by the graph lines of FIG. 8, classifier product samples are treated with one percent lignosulfonate but preferably citrus oil. One sample was exposed to forced air at 350 degrees F., while another sample was exposed to still air at 90 degrees F. ambient. The percent reduction of moisture content in the forced air classifier product is shown by graph line 180, and it can be seen that within the first 10 minutes, a very dramatic moisture reduction occurs as compared with the moisture reduction of the classifier product in static air as shown by graph line 182. The effect on the moisture content of the classifier product under forced air condition shows that within about 15 minutes as depicted by graph line 184 there was a percent moisture reduction that could not be achieved in still air until about a lapsed time of 30 or more minutes as depicted by graph line 186. Thus, as can be clearly understood by those skilled in the art, the effect of lignosulfonate but preferably citrus oil greatly enhances the speed at which dewatering of the mass of coal particles occurs.

Figure 9:
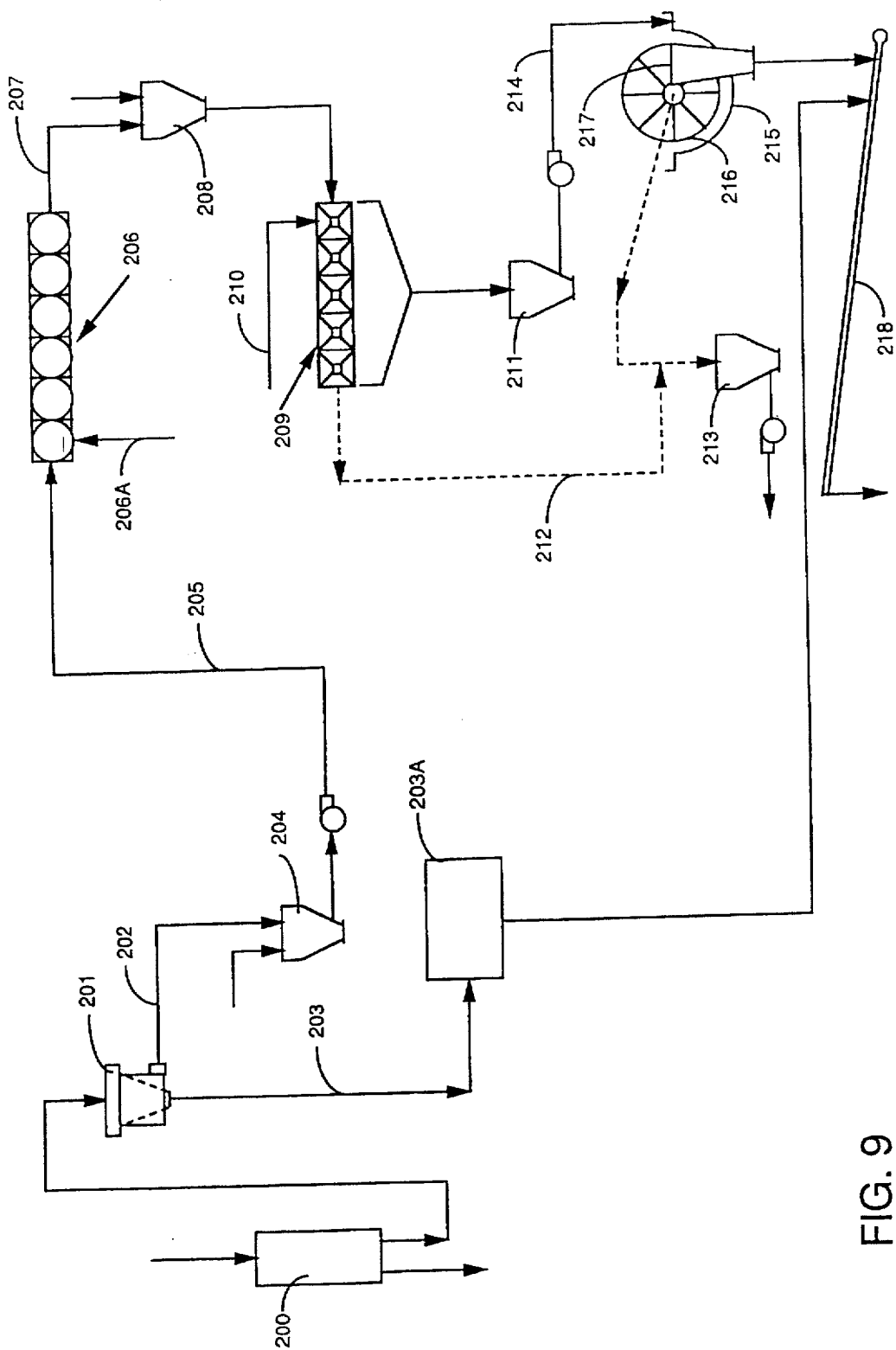
FIG. 9 is a schematic illustration of a preferred arrangement of apparatus of the present invention which is also suitable to carry out of the method thereof.
Figure 10:
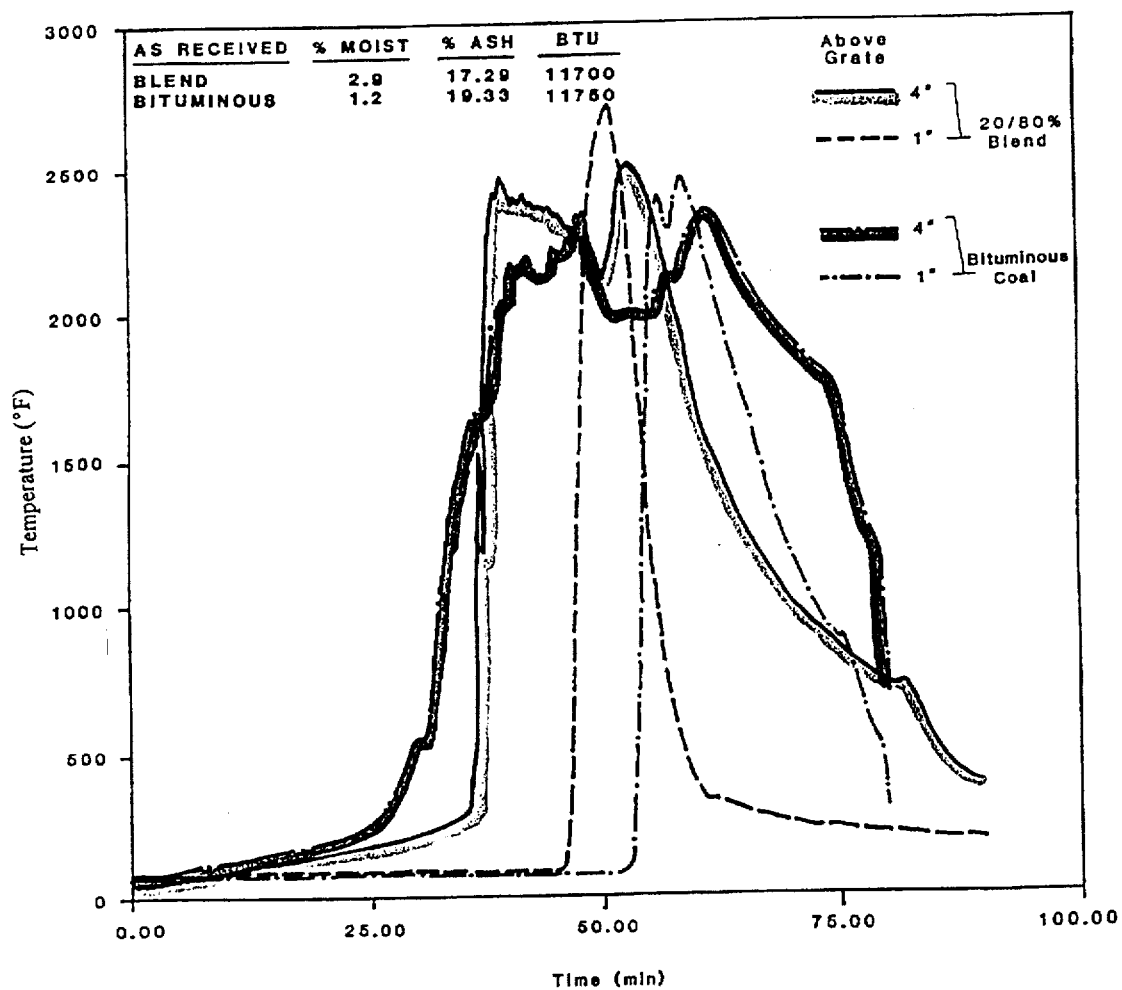
FIGS. 10 and 11 are graphs illustrating time/temperature and time/$So_x$ generation, respectively of bituminous coal with and without the process material of the present invention.

In FIG. 9 there is illustrated a preferred embodiment for carrying out the method of the present invention. A raw silt-pond feedstock undergoes initial processing in a raw feedstock supply 200 which includes as an initial preparation of the feedstock, screening the feedstock to obtain a minus 4" fraction which undergoes deagglomeration, processing and classifying to derive a minus ¼" size fraction. The minus ¼" fraction is treated in a holding vessel with a pH reagent and mixed with quantities of water to form an aqueous slurry of minus ¼ particles of coal contaminated with clay adhered to the coal particle surfaces. The process of the present invention is addressed to treating ultra-fine coal particles and therefore the slurry is delivered to a classifying device preferably in the form of a sieve 201 which supplies in line 202 a minus 50 micron fraction and in line 203 an oversized product of ¼×50 micron. The oversized product in line 203 can be beneficiated by apparatus 203A comprising well known apparatus and then the product recombined with the minus 50 micron fraction after undergoing treatment according to the present invention. The undersized product in line 202 is treated in a vessel 204 with a pH reagent thereby the pH of the slurry is adjusted to a predetermined value of between 6 and 9, preferably at or about 7.0. The pH adjusted slurry is fed by line 205 to one or a series of peptization cells 206. As in the other embodiments of the present invention, the slurry is treated in the peptization cells with the addition of a peptizing agent supplied by line 206A in the presence of an impeller that imparts sufficient energy to the slurry to strip clay from the coal surfaces and reduce the size of the clay to platelets in the presence of the peptized agent. The clay platelet in the presence of the peptizing agent is peptized instantly to impart an electrokinetic charge to the clay platelets rendering it repulsive to other clay platelets as well as incapable of electrokinetic re-adherence to the surface of the coal particles. The peptized clay platelets have a particle size of less than 2 microns.

The slurry containing the peptized clay platelets and coal particles with clean face surfaces is collected from the peptizing tank(s) for feeding by line 207 in a vessel 208. The slurry in line 207 is made up of 30% solids and in vessel 208 there is added to the slurry additional quantities of water to reduce the slurry to about 5% by weight solids. The slurry is then supplied from the vessel to an array of froth floatation cells 209 wherein the slurry is combined with reagents supplied in line 210. The froth fraction carries the coal particles to a froth sump 211 while an underflow from the froth cells is delivered from line 212 to a tailings sump 213 which in turn delivers the tailings for disposal. The tailings are comprised mainly of a peptized clay and aqueous medium of the slurry. The fraction delivered from the tailings sump 213 is generally a minus 5 micron fraction and may be specifically chosen to comprise a minus 2 micron fraction. However, coal particles in the fraction (i.e. minus 5 micron fraction or minus 2 micron fraction as the case may be) report with the froth product and will impart to the recovered coal particles a microsized coal fraction which is significant to the particle size distribution and enables a loading of the coal product with 3 to 4 times greater coal particles in a minus 15 micrometer coal fracture. The clay platelets which are peptized in the process of the present invention attain a state of discreetness in the slurry with a size that falls within a minus 2 micron fraction.

Turning now to the froth slump 211, the fraction is delivered to line 214 to a dewatering device which in the preferred form shown in FIG. 9 comprises a vacuum filter 215. In its preferred form, the vacuum filter is a disc type filter. Such a filter includes a multiplicity of side-by-side discs carried by a hollow rotatable arbor. Each filter disc is made up of arcuate segments that can operate independently of one another. Each disc rotates to submerge a lower part of the disc in an aqueous medium containing the slurry supplied by line 214. A vacuum is applied to the disc to form an initial layer of ultra fine coal particles. The initial layer of clay-laden coal particles on the submerged portion of the disc in the absence of the present invention would normally severely impede the separation of water from the solids of the slurry. However, according to the present invention since the coal particles are free of adhered clay the collection of coal particles on the disc forms a dilatant coal layer which facilitates the extraction of aqueous medium as well as peptized clay platelets through the dilatant coal layer. As this occurs additional quantities of coal particles are collected in a superimposed relation on the initial dilatant coal layer so that there is formed a dilatant coal mass which continues to offer great permeability for a discharge flow of aqueous medium as well as peptized clay. The dilatant property of the coal mass continues while the mass is carried by the disc filter from froth containing a slurry to an open atmosphere which then provides that the dilatant property serves to continue the extraction of aqueous medium along with peptized clay for dewatering the mass. The filter cake now adhered to the filter disc is carried by the rotation of the disc to a designated discharged site which is identified in FIG. 9 by reference numeral 216. At the discharged site, the individual segment of the disc is supplied with relative low pressure air to discharge the filter cake from the surface of the screen. The release process of the filter cake is also enhanced by the operation of a scraper blade identified by reference numeral 217. The dewatered filter cake which is recovered by the vacuum filter is discharged on to a conveyer belt 218. It has been found that the moisture content of the coal product recovered on conveyer 218 will initially have a moisture content of between 18% and 20% depending upon the particle size distribution. However, when 70% of the coal particles are minus 37 microns, the moisture content may be as high as 28%.

Experiments with dilatant properties of the coal mass have been carried out in which a mass of coal collected in a pile about 6 foot high was allowed to be exposed to the outside environment for an extended period of time. About 6 inches in depth into the coal mass, a 6% moisture content was found whereas at a depth of about 3 feet, the moisture content was about 8% and at about a depth of approximately ground level, the moisture content was about 18%. The initial moisture content was 18%. Thus it has been found that the dilatant property of the coal mass expels moisture from ultra fine coal particles to a large extent by capillary action. This has been found to exists because the clay adhered to the surface of the coal particles vigorously retains inherent moisture in the clay itself. This inherent moisture is not easily given up without the application of economically unacceptable amounts of external energy, such as heat energy.

In regard to the embodiment of FIG. 9, in the event it is desired to obtain a clean coal product with greatly reduced water content of the resulting coal mass according to the present invention wherein the coal product is made up of coal particles having a much greater size than 50 microns, such may be accomplished by feeding the aqueous slurry of the raw feed supply 200 directly to the peptizing cells 201. After peptizing, the slurry can be treated in a sieve for size separation to obtain a large coal fraction and an ultra-fine coal fraction. The large coal fraction typically made up of a greater than 50 micron fraction and a minus 50 micron fraction. The greater than 50 micron fraction can be dewatered using a vibrating screen and the minus 50 micron fraction can be dewatered as described supra by feeding the fraction to the froth flotation cells 206. Thereafter the product from the froth flotation cells can be processed in the same manner as already described in the embodiment of FIG. 9.

It has been found that the ultra fine coal product derived from the method and apparatus of the present invention has a remarkably increased BTU value as compared with an untreated product. Using a bomb calorimeter test, it has been found that a minus 50 micron coal fraction after treatment according to the treatment of the process of FIG. 9, exhibits between 100 and 150 greater BTU value on a moisture ash free basis than a like minus 50 fraction without processing according to the present invention.

The fine coal product according to the present invention is well suited to form a coal water mix product of which tests have shown that the coal water mixed product burns with a combustion flame corresponding to the combustion flame of number 6 oil including a full constant color flame without a temperature gradient along the length of the flame and transversely thereof. The coal water mix contained a 31% moisture content on a dry coal weight basis and the coal particles consist of Bituminous Coal. The ratio of the surface area of a fuel particle to its mass is of considerable importance to the diffusion of oxygen in both atmospheric, circulating fluid, bed (ACFB) and pulverized coal (PC) combustors. To illustrate, a 6,250 micro meters (¼") cubical particle has a ratio of surface area to mass of 1 to 1,356. The mean particle size of the fine coal product of the present invention is considered to be about 40 micrometers in cubical form. A particle of this size has a ratio of surface area to mass of 1 to 8.66, a ratio that is 156 times more favorable to oxygen acceptance than a ¼" cube.

Once introduced to the combustion chamber of an ACFB, the clay-free fine coal particles of the present invention experienced a rate of heating in excess of 10 to possibly 1,000 times the heating rate experienced by a ¼" coal waste fuel particle. At this heating rate, drying, volatile release and volatile combustion of the of the fine coal particles may have taken place in as little as one one-thousandth of a second. Thereafter, the residual char of the fine coal particles is consumed in a Regime I char combustion behavior environment. Total time of combustion without interference may have been less than one-hundredth of a second.

A clay coating blocks instant diffusion of oxygen throughout the pores of the ultra fine coal particles. Removal of clay from the surfaces of these coal particles eliminates the time required to defoliate the clay coating. This greatly accelerates the cycle burnout time from initial heating through total combustion. In this manner, the loss of uncombusted and partially combusted ultra fine particles to the baghouse is greatly reduced. As a result, the combustion efficiency of ultra fine fuel is greatly increased. This is true for an ACFB with a fuel residence time of three to four seconds as well as a residence time of two seconds for a PC boiler or ACFB unit occur as a loss of carbon to the baghouse ash. A clay coating blocks instant diffusion of oxygen throughout the pores of the ultra-fine coal particles. Thereafter, its presence results in the loss of uncombusted and partially combusted fine carbon particles to the baghouse.

For testing purposes, a stoker simulator combustion testing device consists of a well-insulated bench scale combustion chamber with stack and elutriate collector capable of simulating the combustion of stoker coal and measuring the performance thereof. It is totally instrumented and computerized.

The following fuels were tested:"processed material", being the fine coal product of the present invention; "unprocessed material", being the refuse filter cake feedstock; "bituminous coal", being a stoker fuel available to the laboratory; and a blend of 20% "processed material" and 80% "bituminous coal".

For each test, the following results were measured and graphically displayed: temperature profiles as a function of time; carbon monoxide at 3" (180 degrees radial) and 40" (stack) above the grate and in the flue gas; pressure drop across the fuel bed; oxygen at 2", 3", 4" (180 degrees radial), and 49" (stack) above the grate, also in the flue gas; and concentration of oxides of sulphur and of nitrogen.

Figure 11:
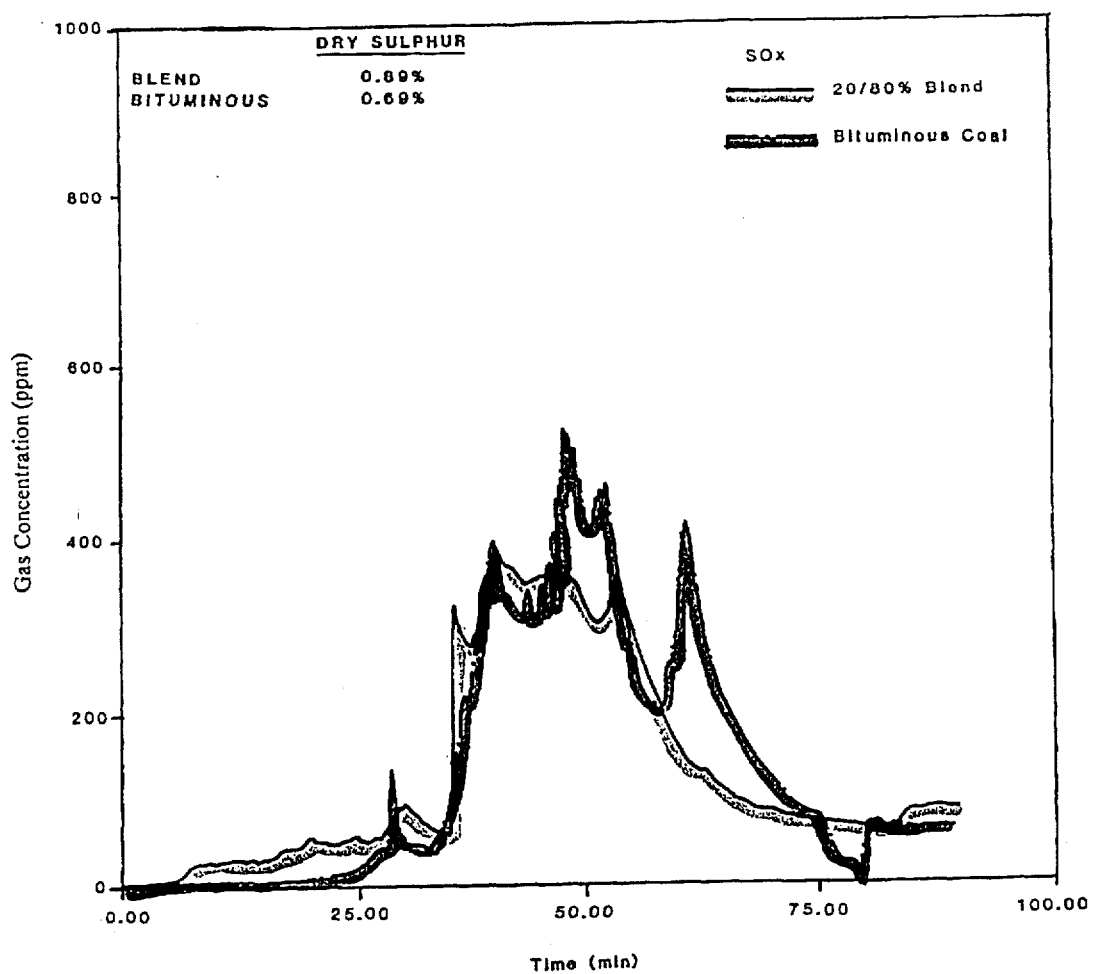

Test results demonstrated enhanced reactivity for the 20% fine coal product of the present invention/80% bituminous blend versus straight bituminous coal with slightly higher peak temperatures. On an approximate equivalent BTU bases, the blend delivered its energy in an 18% shorter time span than did the bituminous coal. This is illustrated in the graph of FIG. 11: where the temperature profiles as a function of time for a blend of 20% processed material and 80% bituminous coal and for bituminous coal are displayed together with a indication of the moisture ash and BTU.

As measured by the areas encompassed within the curves for each, the test results again revealed the phenomenon of reduced $So_2$ as generated by the blend of fine coal product with bituminous coal. In this instance the higher sulphur content of the fine coal product resulted in an increase of 29% in the sulphur content of the blend versus that of the bituminous coal.

Figure 12:
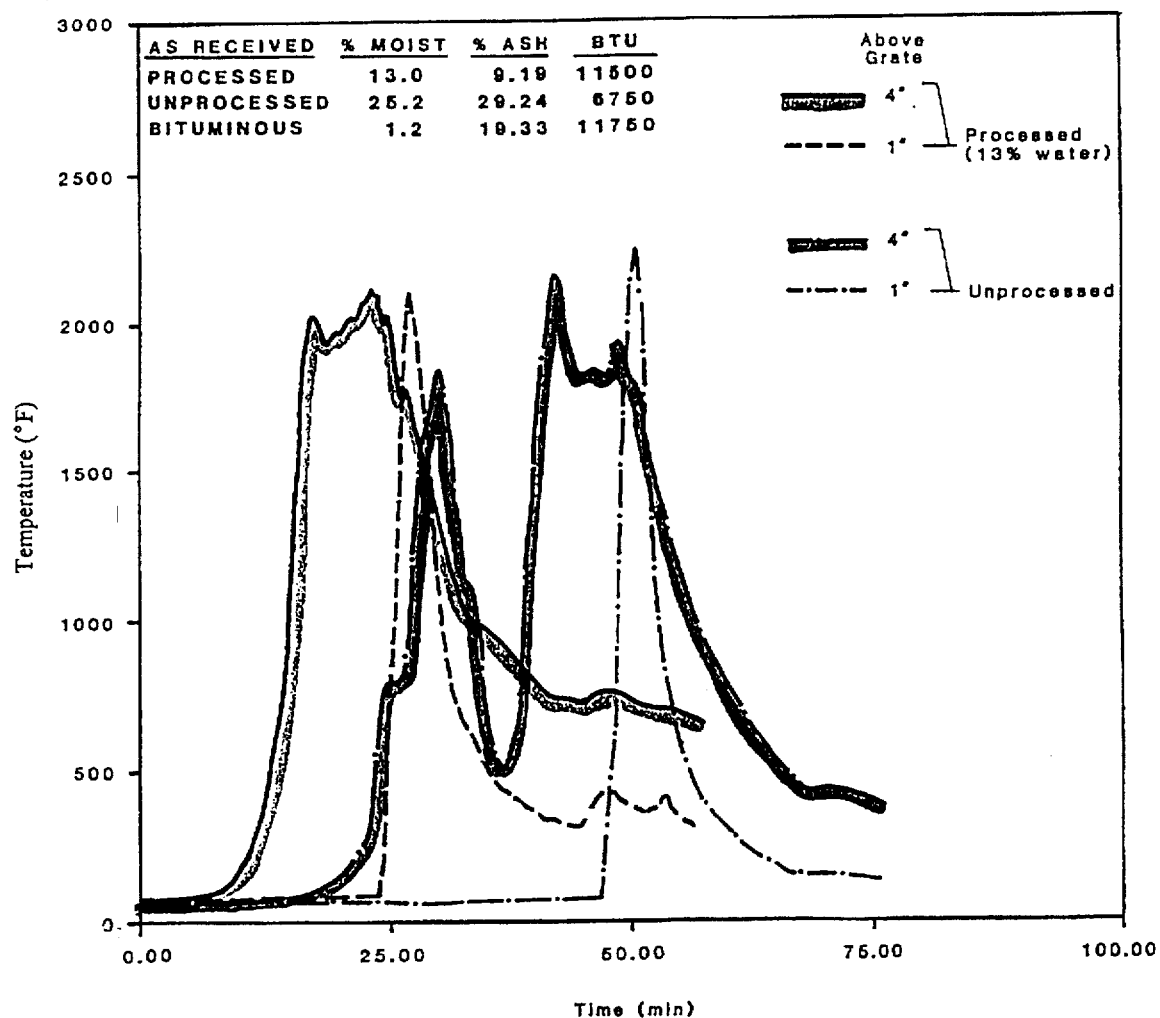
FIGS. 12 and 13 are graphs illustrating bed time/temperature of processed fine coal particles and for unprocessed fine coal particles bituminous coal with and without the process material of the present invention.

This, coupled with the slight reduction in generation for the blend versus the bituminous coal approximates to an equivalent stoichiometric reduction of 27% less $SO_2$ generation for the blend versus the bituminous. This is illustrated in the graph of FIG. 12 wherein the concentration of oxides of sulphur is displayed as a function of time for a blend of 20% processed material and 80% bituminous coal and for bituminous coal. The reduced NOx production was found to be 20–40% lower as compared with a 30×0 micro coal fraction before stripped of clay.

Figure 13:
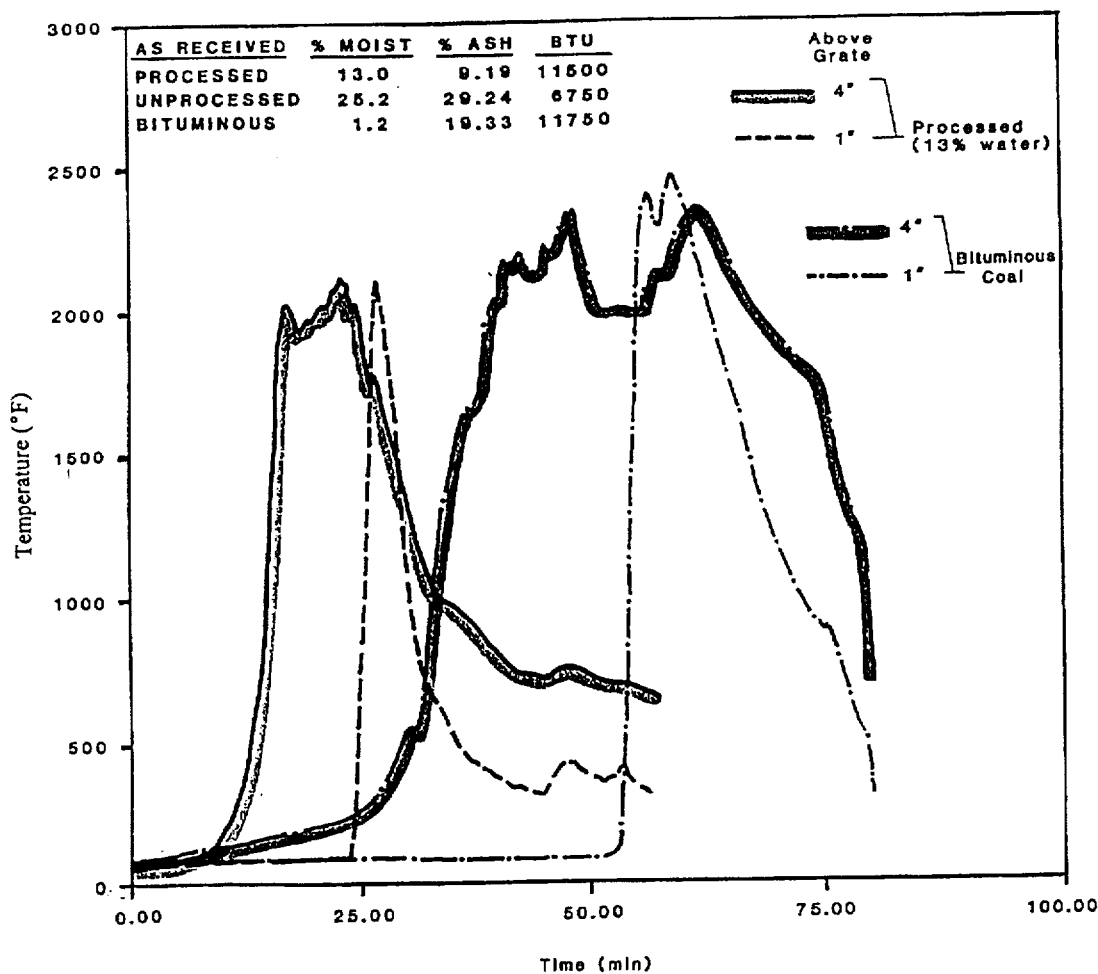
Figure 14:
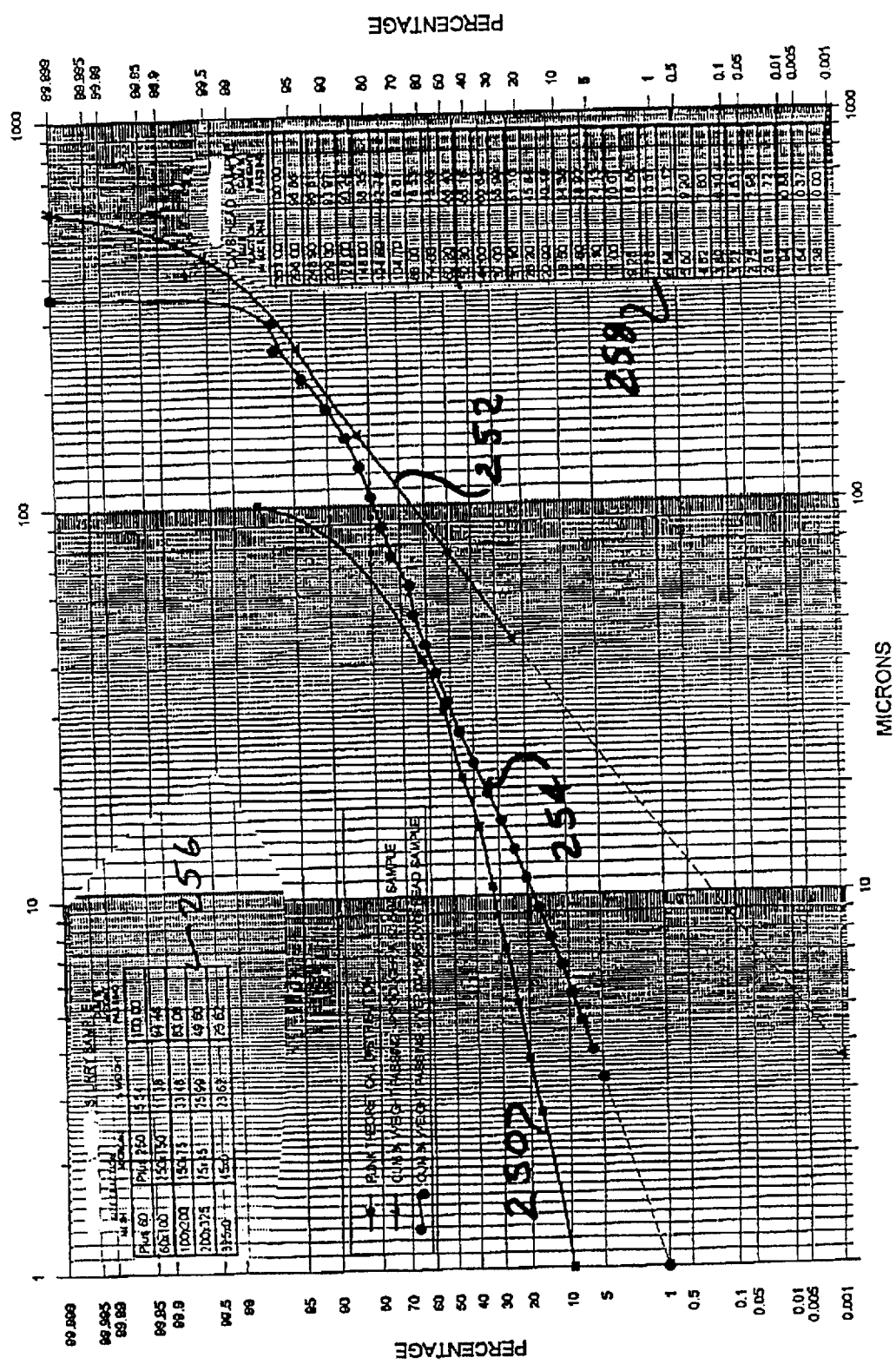
FIG. 14 is a particle distribution graph for a coal water mix in which graph lines are given for the theoretic distribution according to Funk U.S. Pat. 4,416,666, the prior art and according to the fine coal product of the present invention.

Bed temperature profile graphs derived from this testing very well illustrate the lower combustion temperatures of the fine coal product over the bituminous stoker and its improved reactivity over both the unprocessed material as well as the bituminous stoker. This is illustrated by the graph of FIG. 13 wherein the temperature profiles are given as a function of time for processed material (with 13% water) and for unprocessed material. The graph of FIG. 14 displays the same temperature profiles with respect to bituminous coal.

The processed coal particles with a 13% moisture reached a peak combustion temperature at 2150 degrees Fahrenheit as compared with a peak combustion temperature of unprocessed Bituminous Coal at 2200 degrees Fahrenheit with a 25.2% moisture content on a dry coal weight basis and comparable with a peak combustion temperature of 2500 degrees Fahrenheit of unprocessed Bituminous Coal at 1.2% moisture content on a dry coal weight basis.

The development of the fine coal product that essentially includes a minus 300 micrometer particle fraction may, if desired, use a feedstock generated from conventional coal benification methods including the use of froth flotation to recover ultra fines. The circuitry includes the use of ball mills and/or other grinding devices to reduce the particle size distribution of the feedstock to at least 70% minus 200 mesh (74 microns) after cleaning. The use of such a feedstock for a coal water mix has been dependent upon the addition of a high cost dispersant to impart acceptable characteristics of fluidity with a dry solids content approaching 70%. The failure of froth flotation to permit recovery of the majority of the clay inhibited ultra fine coal particles smaller than about 45 microns results in a feedstock lacking the presence of minus 25 micron particles as is needed for proper rheology, atomization and combustion. As Funk has set forth in U.S. Pat. No. 4,416,666, the optimum particle size distribution in a carrier water is shown by graph line 250 in FIG. 14. Graph line 252 depicts a typical size distribution of a coal water mix according to the prior art and graph line 254 depicts particle size distribution for a coal water mix according to the present invention. Also given in the graph are the size, percent by weight and accumulative percent by weight at 256 and 258 for the prior art graph 252 and the present invention graph 254, respectively. It can be seen that the prior art coal water mix line 252 is devoid of a minus 45 micron coal fraction. It will also be observed that there is a distinctly greater quantity of a smaller size coal fraction at minus 10 microns than as shown by the projected particle distribution shown by line 252. In other words, there is about 200 times more minus 10 micron coal particles in the instant invention than in the standard prior art coal mix. Efforts were undertaken by others to develop a "low tech" coal water slurry without the benefit of a dispersant. It was found that a mixture of 50% coal with 50% liquid was about the maximum possible solids and still maintain acceptable stability using a clay laden filter cake feedstock derived from conventional froth flotation.

Figure 15:
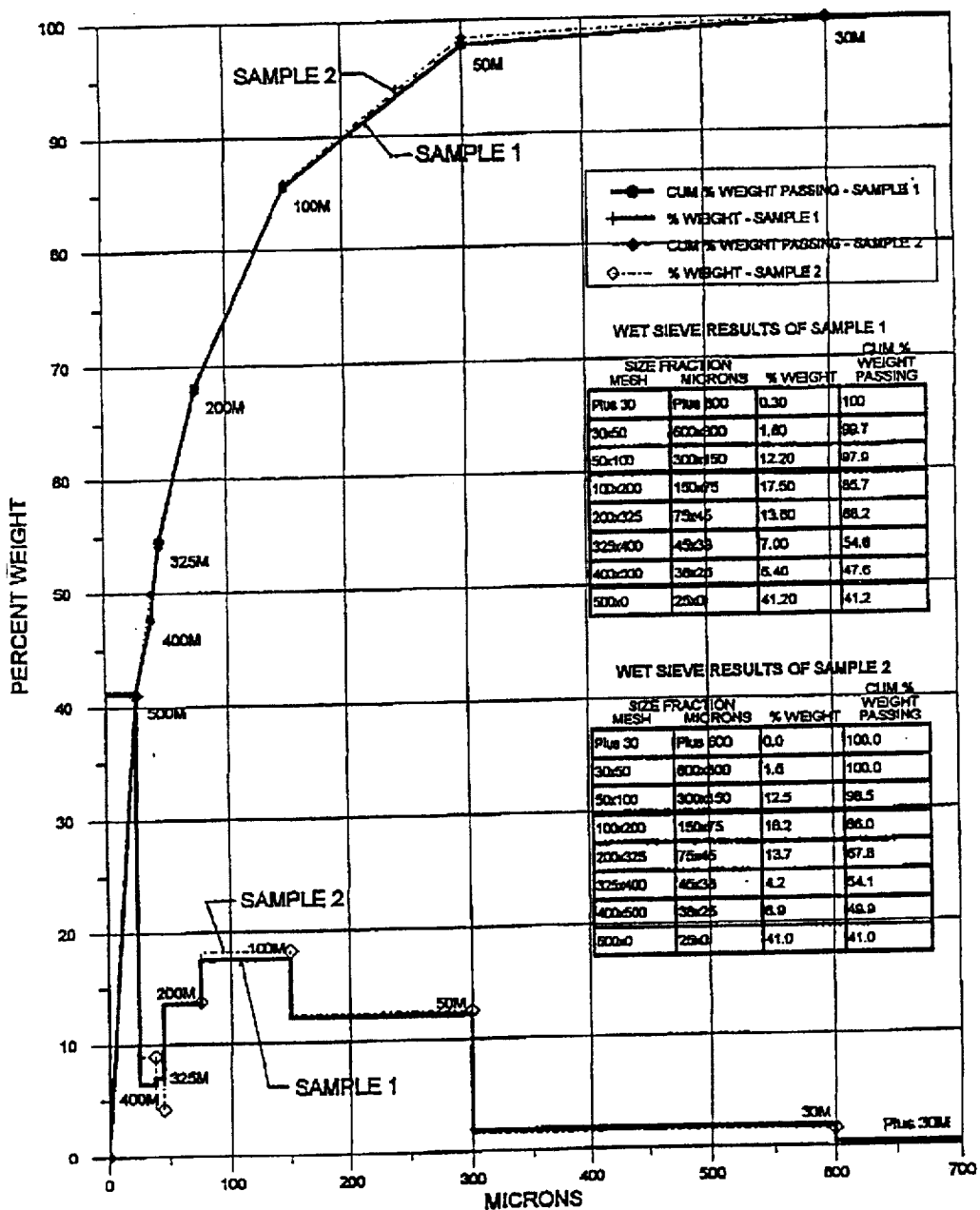
FIG. 15 is a percent weight/micron particle size graph for a test burn of a coal water mixes.

The repeatability of uniformity of particle size distribution using the dewatered coal product recovered according to the method and apparatus disclosed herein as a feedstock is illustrated in the graph of FIG. 15 together with other feedstocks. It is important to note that the most important percentage of particles reporting as being less than 25 microns in size was about 41.%.

Figure 16:
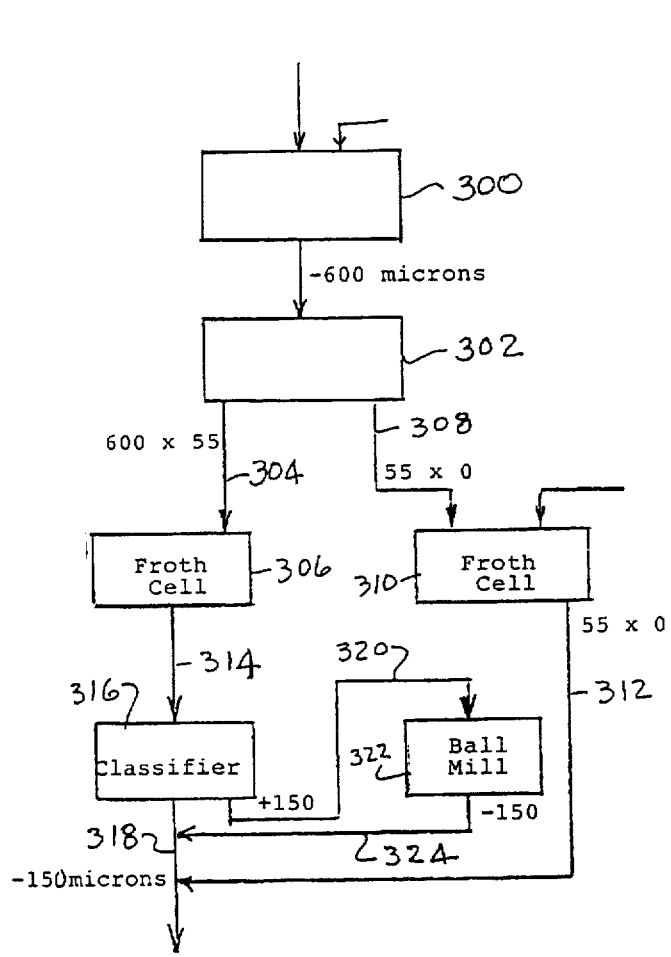
FIG. 16 is a preferred process for producing a coal product comprising a minus 600 micron fraction.

Referring to FIG. 16, the coal product of the present invention may be most preferably obtained from a method and apparatus for recovering coal particles from silt ponds in which the recovered coal mass is initially formed as a slurry in a vessel 300. Due to the nature of the source of the coal product from a silt pond, the particle size distribution of solids making up the slurry will comprise a minus 600 micron fracture. The slurry is treated to adjust the pH to near 7.0 following which a peptizing agent such as sodium hexametaphosphate is added to the slurry to peptize the clay platelets which are mechanically driven from the surface of the coal particles by a high shear force resulting from high shear mixing using a mixing blade that is submerged in the tank containing the treated slurry as described in the embodiment of FIG. 9. By this process, the clay platelets are peptized and obtain a state of discreetness and the clean coal surface of the coal particles becomes dilatant. The coal slurry is then treated in a classifier 302 to obtain a first fraction having a particle size distribution of 600×55 micron coal particles in a supply line 304 for delivering the coal product fraction to a froth cell 306. A coal particle fraction 55×0 microns is separately delivered by line 308 to a froth cell 310. The carbon particles are separated from the peptized clay as well as pyrite and other impurities that obtain a state of discreetness in the slurry in the froth cell. The froth fraction is carried by line 312 and comprises a coal fraction with a particle size of 55×0 microns. The coal product obtained from froth cell 306 still retains a particle size distribution of 600×55 microns which are delivered by line 314 to a screen bowl centrifuge 316 wherein the centriate comprises a minus 150 coal particle fraction which is delivered by line 318 to a vacuum filter such as filter 215 for dewatering of the manner described hereinbefore and shown in FIG. 9. The centrate fraction of coal product recovered from the screen bowl centrifuge comprises a +150 micron size fraction which is delivered by line 320 to a ball mill 322 to carry out a grinding operation to reduce the particle fraction to a minus 150 micron. The purpose of the ball mill 322 is to reduce the coal particles to a minus 150 micron size coal fraction to thereby enable use of the coal product as a feed for blast furnace injection, coal water mix and pulverized coal combustors. The particle fraction which is delivered by line 324 for combination with the minus 150 micron size fraction in line 318 and thereby also treated in the filter for dewatering.

Figure 17:
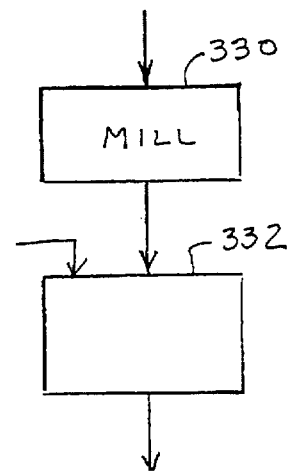
FIG. 17 schematically illustrates a process for obtaining a micronized coal fraction.

The coal product of the present invention most advantageously includes a particle size fraction of minus 10 microns in quantities ranging from about 18% at one micron and in increasing quantities linearly up to 30% at 10 microns. Such a particle size fraction so far as known was historically a discard or if used as in the teachings of the Funk disclosure was highly contaminated with both surface laden clay and inclusions of pyrite, elementary sulphur and organic sulphur. According to the present invention as shown in FIG. 17, a minus 10 micron coal fraction is ultra clean being freed from substantially all surface clay and surface and subsurface sulphur contaminants. The production of such a coal product fraction is obtained preferably by treating a cleaned coal fraction such as, for example, the minus 150 micron coal fraction in line 318 as just described in a micronizer mill 330. A micronizer mill is a disintegrator wherein feed particles are entrained in a pressure jet (steam or air) and whirled through a cylindrical chamber with sufficient force to break them.

A surprising discovery underlining a further feature of the present invention came about when this coal fraction was combined with a quantity of water in vessel 322. The solubilized oxygen content of the water participated very rapidly in the oxidation reaction with the sulphur contaminant of the coal particles. Within a period of two to eight hours the pH level of the coal slurry contained a highly acidic pH value of less than 3 and sometimes less than 2. As described hereinafter, repeated washings of the coal fraction have been found to greatly benefit sulphur removal.

In the formulation of a coal water slurry having 50% by weight solids and the remainder liquid it was found that the reaction of sulphur removal continues beyond the mere fixing of the pH level at near 7.0. Even after the slurry was stored for a short period of time, about 24 hours, the pH returned to 2.7.

It is believed that the phenomena of resorting to a high acidity pH level is explained by the fact that clay present on the surfaces of the coal particles acts as a buffer and once it is removed from the surfaces of the coal particles, then all of the individual organic sulphur atoms that are attached to the coal based molecules are now exposed to what may be occurring as rapid oxidation followed by leaching and dissolution of water soluble SOx. At least 42% of the particle size distribution is subject to instant diffusion of oxygen throughout the cellular structure of the coal particles. This oxygen diffusion perminates the cells within the walls in a similar way that water passes through a membrane in a purification process.

In the following Tables III and IV, 300×0 micrometer coal fraction was divided to form two feedstock supplies. The feedstock reported in Table III was untreated whereby all original clay, pyrite, sulfate and sulphur were present as follows:

TABLE III

| | UNTREATED | | | |
|---|---|---|---|---|
| | Pyritic | Sulfate | Organic | Total Sulphur |
| Sample | | | | |
| Feedstock | 1.09% | 0.56% | 0.60% | 2.25% |
| 1st Stage | 0.97% | 0.47% | 0.42% | 1.86% |
| 4th Stage | 1.00% | 0.39% | 0.49% | 1.88% |

The percent by weight of the various forms of sulphur were measured and recorded. Thereafter, an aqueous slurry of 50% by weight coal particles was formed as a first stage and the slurry water was then extracted and the various forms of sulphur recorded. In the same way, a second, third and fourth aqueous slurry of 50% by weight solids was formed. After the slurry water of the fourth stage was removed, the various forms of sulphur were measured and recorded. Here a 0.02 increase of total sulphur is attributed to the sampling measuring equipment and is scientifically unchanged between the first and fourth stages. The clay reporting with the 300×0 fraction is believed to envelope the discrete particles of coal to such an extent that very little sulphur can react or otherwise be dispersed from the coal. Very dramatic different results occur when the clay is removed from the coal particles as for example, according to the process described hereinbefore through imparting a high shear force through the slurry in the presence of a peptizing agent. The feedstock under analysis in Table IV is the dewatered product. The various forms of sulphur in the feedstock were reported as found in the following Table IV:

TABLE IV

| | TREATED | | | |
|---|---|---|---|---|
| | Pyritic | Sulfate | Organic | Total Sulphur |
| Sample Feedstock | 0.20% | 0.41% | 0.98% | 1.59% |
| 1st Stage | 0.27% | 0.26% | 0.84% | 1.37% |
| 4th Stage | 0.23% | 0.16% | 0.80% | 1.19% |

An aqueous slurry of 50% by weight coal particles was formed as a first stage and after several minutes dwell time following the forming of the slurry, the pH dropped from about 7.0 to below 2.0, and then stabilized at about 2.7. The slurry water was dark red and once extracted to allow measurement of the various forms of sulphur. It is believed the clean coal surfaces of the particles allow solubilized air to oxidize the sulphur placing it in solution. The chemical reaction:

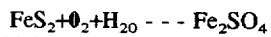

which in turn hydrolysis to form a strong oxidant according to the expression:

A slurry was made a second third and fourth times of 50% by weight solids each time a similar phenomenon occurred with a pH level showing strong acidity but at the fourth stage the pH was stable at 3.7 pH. The sulphur content of the coal particles after the fourth stage as reported demonstrates a very favorable low total sulphur content that will form a valuable coal fraction addition to a treated product for forming coal water mixes or other uses.

Figure 18:
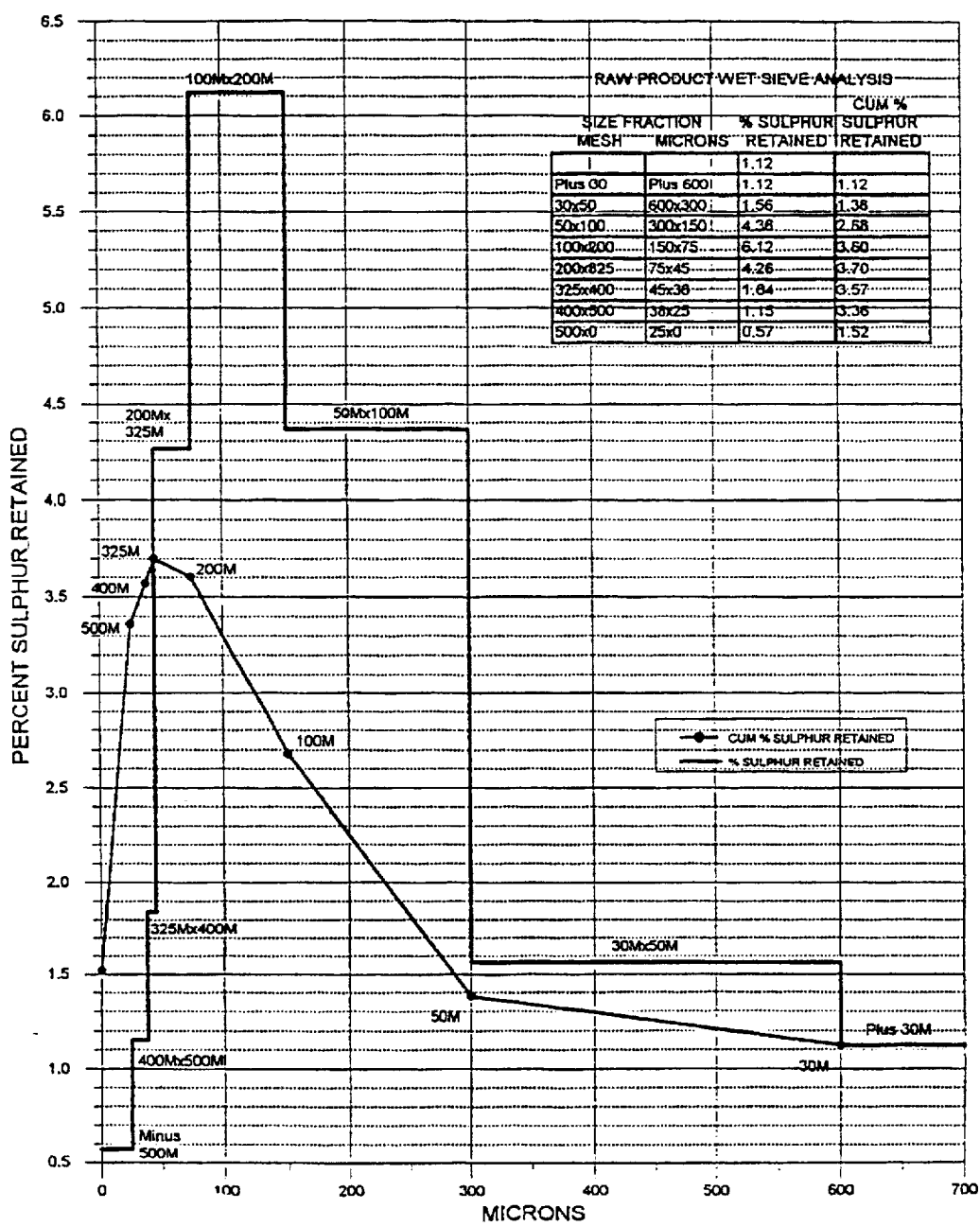
FIG. 18 is a wet sieve particle size sulphur distribution analysis of a typical coal corresponding to silt pond solids.

FIG. 18 represents a particle size sulphur distribution analysis for the thickener underflow solids derived from the Pocohantas No. 3 seam in Wyoming County, West Virginia. This type of sulphur distribution for coal silt solids in a thickener underflow is common to just about all coal seams. Ultra fine coals lost in the coal preparation process reports to the thickener underflow. Thereafter, it is commonly pumped to an impoundment for final disposal. Thus, a thickener underflow and\or raw coal silt recovered from a coal silt impoundment is a suitable feedstock to obtain the coal product of the present invention.

In FIG. 18, it is important to keep in mind that the organic sulphur content of this coal is about 0.5%. Accordingly, the sulphur in the 300 microns by 600 microns particle size grouping reports as one third organic and two thirds pyritic. As shown, there is a rapid increase in pyritic sulphur as the particle size diminishes to about 74 microns. The 150 microns by 74 microns fraction contains some six times the level of pyrite to be found in the 600 microns by 300 microns fraction. Thereafter, the level of pyrite decreases as the particle size decreases so that very few particles less that 25 microns in size are pyrite platelets.

The effect of this change in the concentration of pyrite platelets as the particle size range changes is reflected in the cumulative sulphur content curve. As noted, the cumulative sulphur content peaks at 44 microns with the pyrite concentration in excess of three times that of the plus 300 microns particles.

Elimination of these ultra fine pyrite particles contributes greatly to the enhanced combustion characteristics of the coal product of the present invention, particularly in regard to the substantial reduction in SOx generation therefrom. At the same time, elimination of the accompanying finely divided iron is believed to alter the combustion process in a manner beneficial to enhancement of combustion characteristics of the product as compared to ultra fine coal recovered from other benefication processes that are common to the industry.

Figure 19:
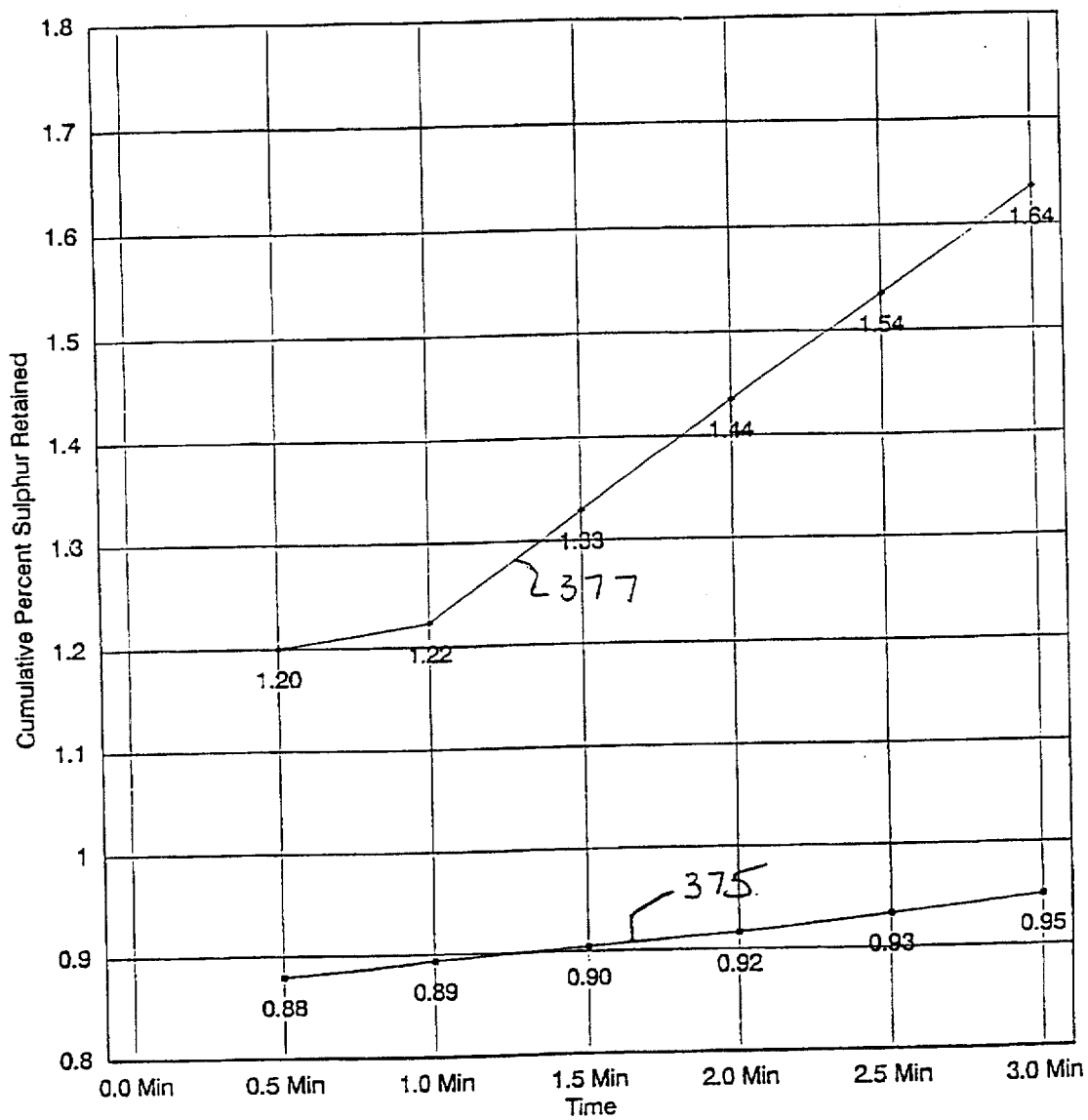
FIG. 19 is a graph showing a comparison of retained sulphur after treating in froth cells.

FIG. 19 shows the elimination of pyrite as demonstrated by bench scale froth flotation testing of the coal product of the present invention, graph 375 treated versus untreated feedstock graph 377. The comparable point of retention time is 2 minutes for coal product of the present invention versus 3 minutes for untreated feedstock. Allowing for 0.5% organic sulphur, the comparison is a pyrite level of sulphur at 1.14% for untreated at three minute retention versus 0.42 for treated at two minute retention. The percentage of pyrite removal through treatment calculates to 63.2%. However, it is believed the level of elimination of pyrite exceeds 90% in most instances. The least elimination was recorded at about 67%.

Figure 20A:
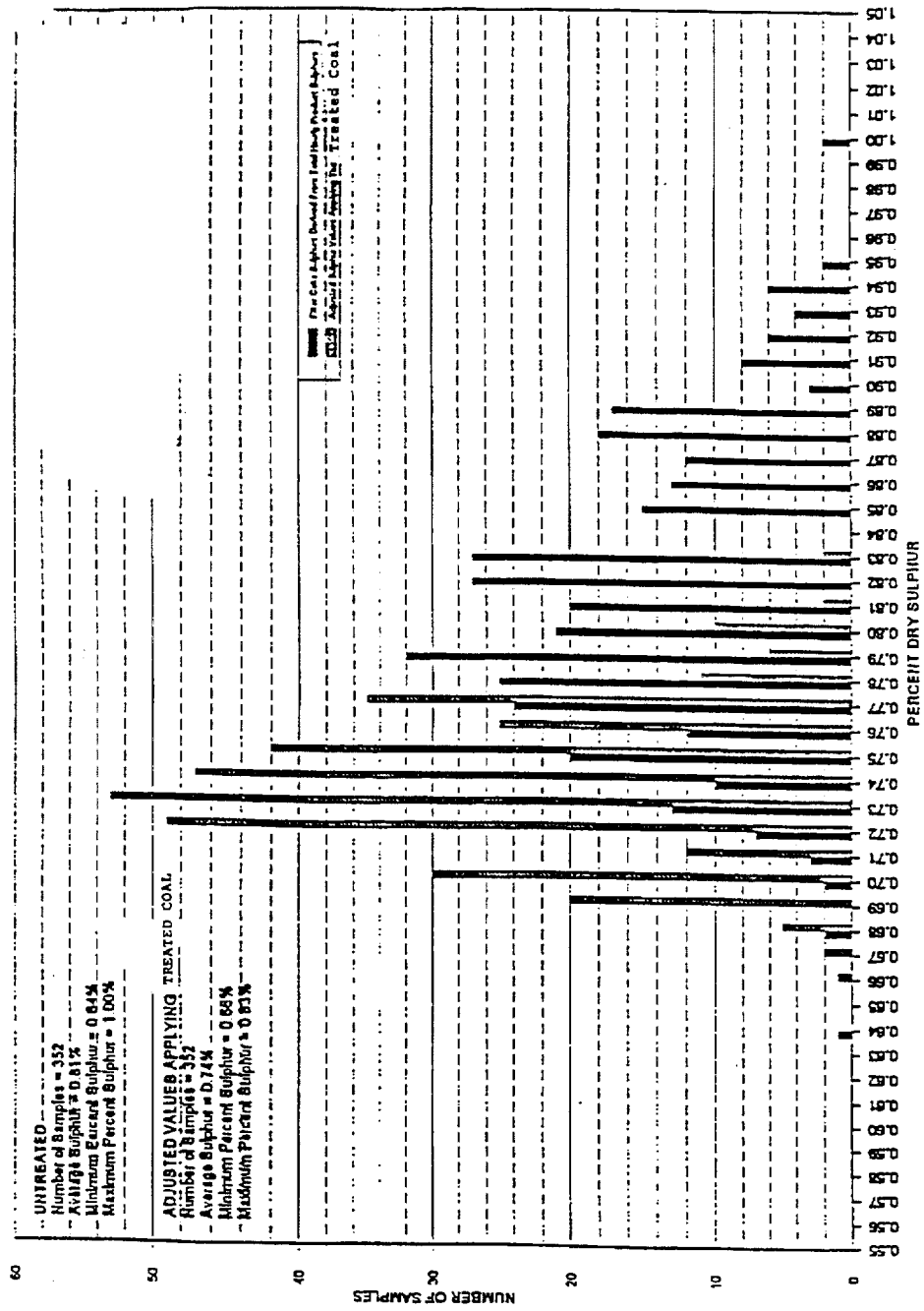
FIGS. 20A–20D are bar graphs comparing retained sulphurs and filter cakes of treated and untreated coal particles.
Figure 20B:
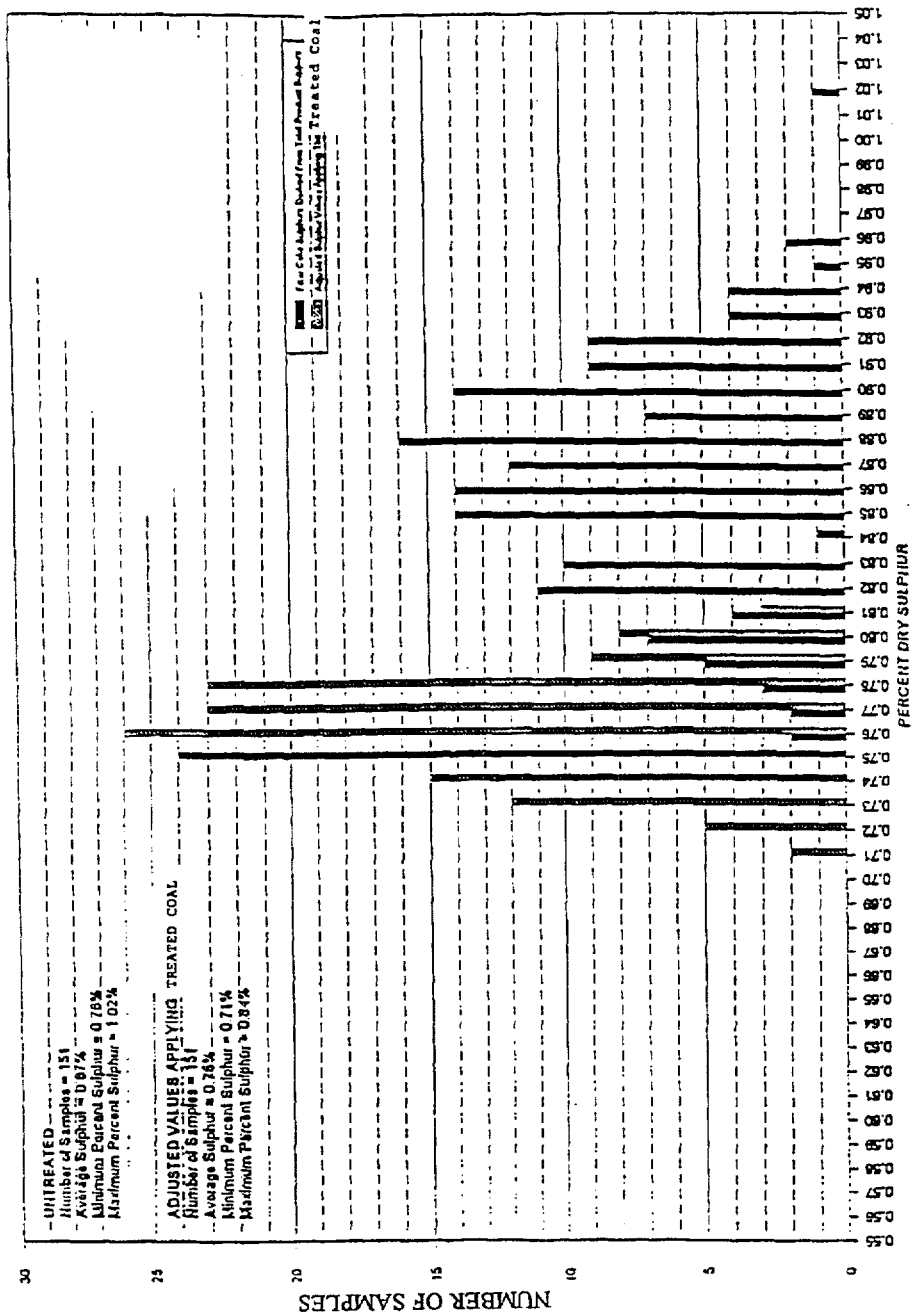
Figure 20C:
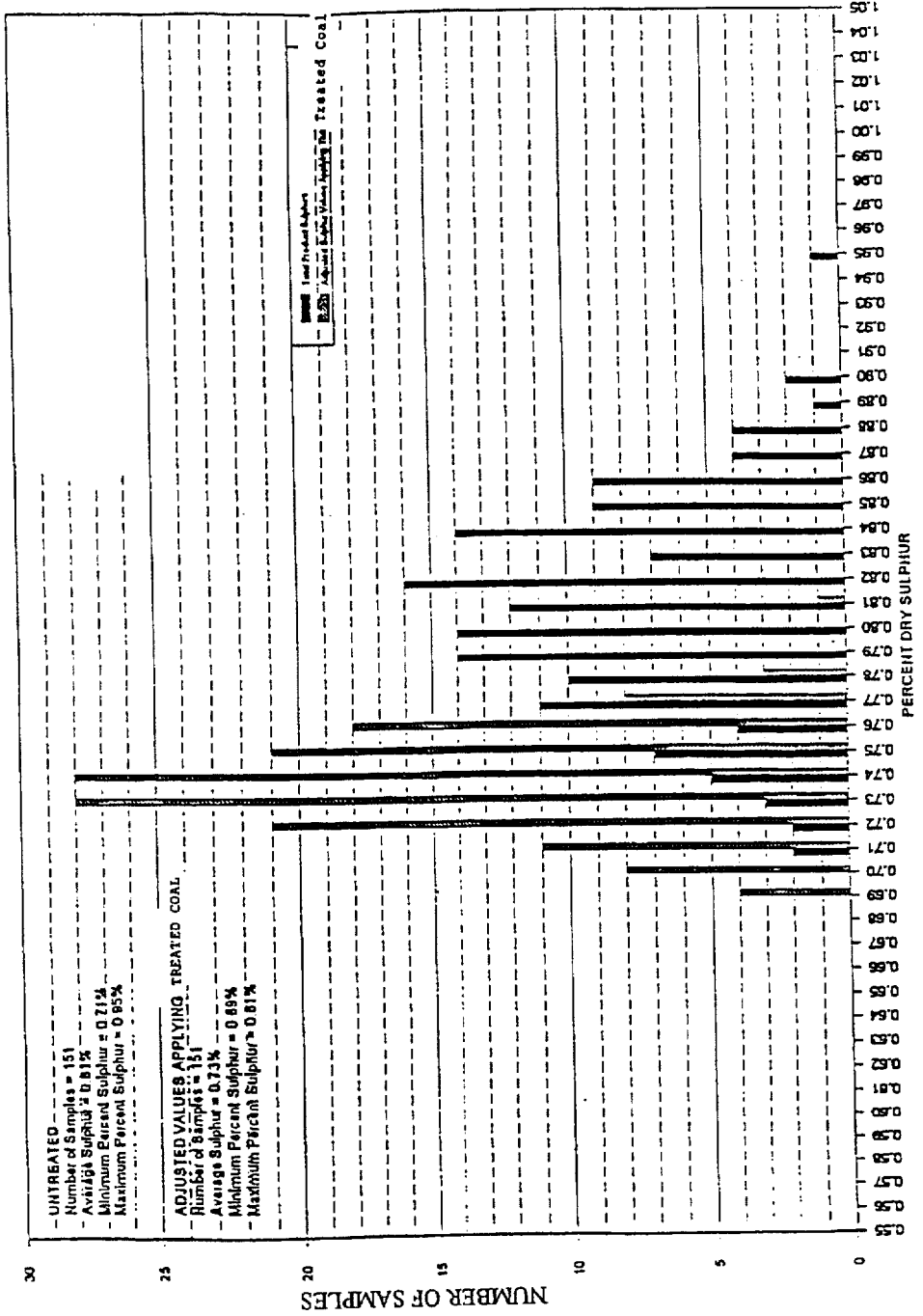
Figure 20D:
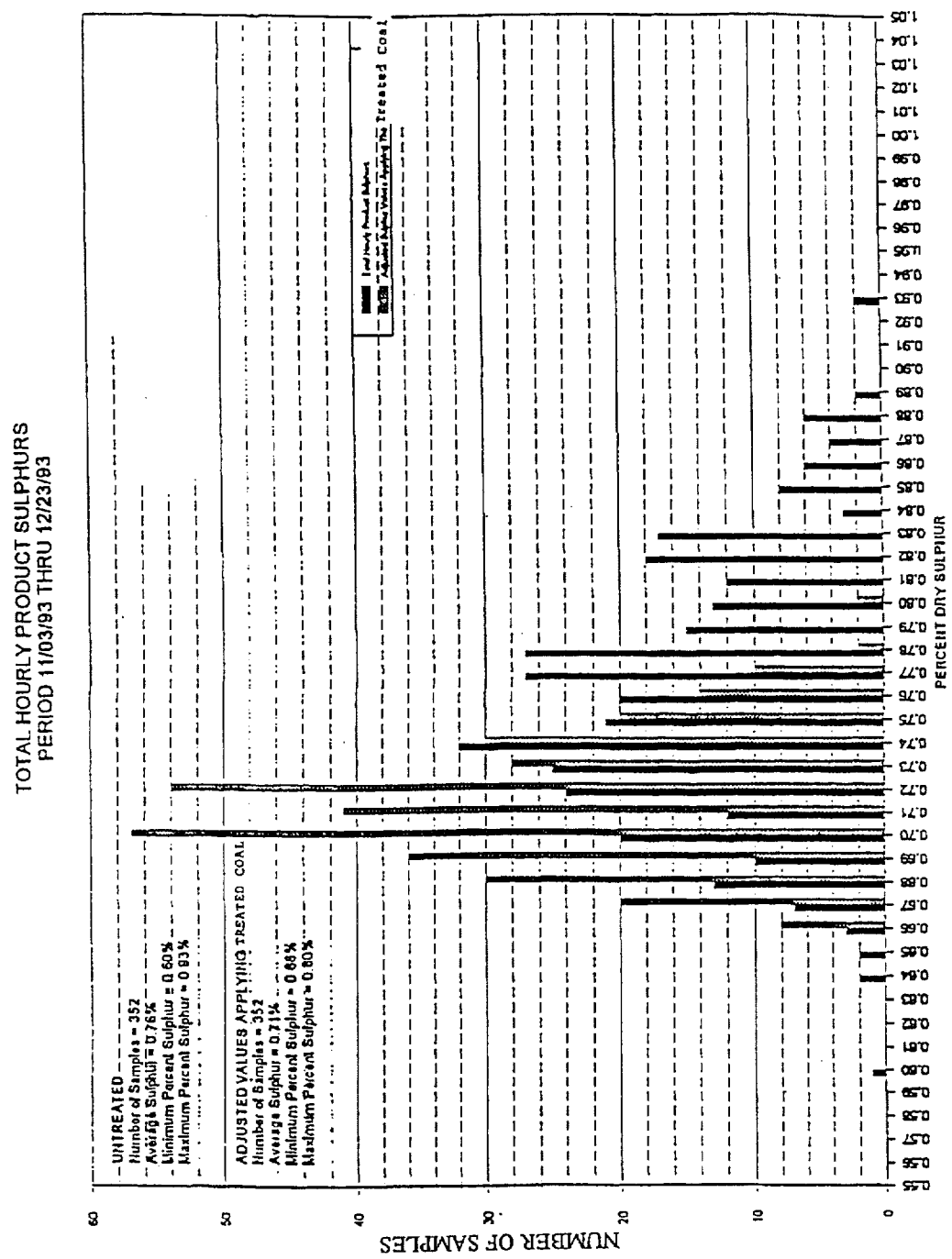

The importance of this reduction of sulphur is reflected in FIGS. 20A, 20B, 20C and 20D. The coal production of mine can be sold as a compliance coal at a high price. Any portion of the production that does not meet compliance specification for sulphur brings a greatly reduced market price or requires the addition of high priced low sulphur coal. The bar graphs in FIGS. 20A–20D cover two groupings of samples of filter cake and total product as taken from hourly samples and then from composites of hourly samples to produce daily results. A sulphur value of less than 0.84% is required to keep this particular coal in compliance. Examination of FIG. 20A shows that 30% of the daily results exceeded the compliance level. If the filter cake had been the coal product of the present invention, 100% of all daily shipments would have met the compliance sulphur specification. In this instance, coal product of the present invention would be a truly value-added product. Similarly, examination of FIG. 20B reveals filter cake sulphurs derived from the total product sulphurs, FIG. 20C the total sulphurs and FIG. 20D the total hourly sulphurs. In each instance it can be seen that the sulphur content of the coal product of the present invention will be more desired due to the consistent and favorably lower sulphur content.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. The coal product produced according to a method of treating clay contaminated ultra fine coal particles, said method including the steps of;

forming an aqueous slurry of clay contaminated ultra fine coal particles;

mechanically stripping clay contaminants from the surfaces of the coal particles while subdividing the size of the clay contaminant to clay platelets;

peptizing the clay platelets to impart a state of discreetness in the aqueous slurry;

collecting a mass of dilatant coal particles in a superimposed relation upon a dilatant coal layer, said dilatant coal layer being defined by forming an aqueously permeable barrier comprised of a dilatant coal layer of collected coal particles from said slurry upon a barrier;

using the dilatancy of said dilatant coal mass in combination with an applied force for dewatering the coal mass by draining aqueous medium along with peptized clay platelets from the coal mass; and recovering the coal mass.

2. The dewatered coal product according to the method consisting of the steps of:

forming an aqueous slurry of clay contaminated ultra fine coal particles;

imparting high shear forces to the slurry containing the clay contaminants from the surfaces of the coal particles and to subdivide the size of the clay contaminant to clay platelets without flocculating the ultra-fine coal particles;

adding a sufficient amount of a peptizing agent to said slurry thereby peptizing the clay platelets to impart a state of discreetness in the aqueous slurry;

subjecting said peptized aqueous slurry to a size separator selected from the group consisting of a sieve having a barrier layer of aqueous permeable unflocculated dilatent coal thereon, and a filter having a barrier layer of aqueous permeable unflocculated dilatent coal thereon, thereby forming a mass of dilatent coal particles;

using the dilatency of said dilatant coal mass in combination with an applied force for dewatering the coal mass by draining aqueous medium along with discrete peptized clay platelets from the coal mass; and recovering the coal mass.

3. A fine coal product essentially including an ultra fine coal particle fraction, the coal particles being dilatant by the mechanically stripping of clay contaminants from the surface of the coal particles and subdividing the clay to clay platelets in the presence of a peptizing agent to peptize and maintain clay platelets discreet in an aqueous slurry, the dilatant coal particles being unflocculated and capable of producing an aqueously permeable barrier on a sieve for forming a filter cake having a moisture content lower moisture than an ultra fine coal particle fraction before stripped of clay, the reduction of clay contaminants on the coal particles increasing a calorific value at least 100 Btu per pound as determined by a bomb calorimeter.

4. The coal product according to claim 3 having a reduced NOx production of 20 to 40% as compared with a coal fraction reduction before striped of clay.

5. The coal product according to claim 3 wherein said at least 100 Btu is between 100 and 150 Btu.

6. The coal product according to claim 3 wherein said ultra fine coal particle fraction consists of coal particles recovered from a silt pond.

7. The coal product according to claim 3 wherein the ultra fine coal particle fraction consists of refuse coal particles from the cleaning of freshly mined coal.

8. The coal product according to claim 3 wherein the ultra fine coal particle fraction consists of freshly mined coal prior to cleaning.

9. The coal product according to claim 3 wherein said coal fraction essentially includes a minus 40 micron coal fraction with carbonaceous coal faces stripped of clay for exposing sulphur contaminants consisting of sulfate, pyrite and organic sulphur to undergo leaching and dissolution of water soluble SOx in an aqueous medium.

10. The coal product according to claim 3 wherein said ultrafine coal fraction essentially includes a 15×0 micron coal fraction having a reduction to organic sulphur of a least 0.14 percentage points on a dry basis from the organic sulphur of a 15×0 micron feedstock.

11. The coal product according to claim 3 wherein said ultrafine coal fraction essentially includes a coal fraction of 15×0 micron coal fraction having a reduction to sulfate sulphur of at least 0.15 percentage points on a dry basis from the sulfate sulphur content of a 15×0 micron feedstock.

12. The coal product according to claim 11 wherein said reduction to sulfate sulphur is 0.25 percentage points.

13. The coal product according to claim 3 wherein said ultrafine coal fraction essentially includes a 300×0 micron coal fraction having a reduction to a total sulphur content of at least 0.29 percentage points on a dry basis from the total sulphur content of a 300×0 feedstock.

14. The coal product according to claim 13 wherein said reduction to a total sulphur content is 0.40 percentage points.

15. The coal product according to claim 3 wherein said ultrafine coal fraction essentially includes a 15×0 micron coal fraction having a reduction to a total sulphur content of at least 0.22 percentage points on a dry basis from the total sulphur content of a 15×0 feedstock.

16. The coal product according to claim 15 wherein said reduction to a total sulphur content is reduced by leaching and dissolution of water soluble SOx in an aqueous medium by 0.18 percentage points.

17. The coal product according to claim 3 wherein said coal product forms a coal water mix for combustion characterized by a combustion flame corresponding to the combustion flame of number 6 oil including full constant color flame without temperature gradient along the length of the flame and transversely thereof.

18. The coal product according to claim 17 wherein said coal particles contained a 13% moisture content on a dry coal weight basis and said coal particles consist of Bituminous Coal and wherein the coal particles defined a peak combustion temperature at 2150 degrees Fahrenheit as compared with a peak combustion temperature of unprocessed Bituminous Coal at 2200 degrees Fahrenheit with a 25.2% moisture content on a dry coal weight basis and comparable with a peak combustion temperature of 2500 degrees Fahrenheit of unprocessed Bituminous Coal at 1.2% moisture content on a dry coal weight basis.

* * * * *